(12) United States Patent
Tyrin et al.

(10) Patent No.: US 8,113,655 B1
(45) Date of Patent: Feb. 14, 2012

(54) TRAINING METHOD FOR ACCOMMODATIVE AND VERGENCE SYSTEMS, AND MULTIFOCAL LENSES THEREFOR

(76) Inventors: Albert Tyrin, Moscow (RU); Nina Kushnarevich, Moscow (RU)

( * ) Notice: Subject to any disclaimer, the term of this patent is extended or adjusted under 35 U.S.C. 154(b) by 84 days.

(21) Appl. No.: 12/804,457

(22) Filed: Jul. 22, 2010

(51) Int. Cl.
*A61B 3/00* (2006.01)
(52) U.S. Cl. ........................................ 351/203
(58) Field of Classification Search .................. 351/200, 351/203–205, 222, 230, 244, 245
See application file for complete search history.

(56) References Cited

U.S. PATENT DOCUMENTS

| | | | | |
|---|---|---|---|---|
| 3,785,724 | A | * | 1/1974 | Cretin-Maitenaz ........... 351/169 |
| 2008/0246914 | A1 | | 10/2008 | Carimalo et al. |
| 2011/0037944 | A1 | * | 2/2011 | Varnas ........................ 351/169 |

FOREIGN PATENT DOCUMENTS

| | | |
|---|---|---|
| GB | 2128361 | 4/1984 |
| RU | 2007975 | 2/1994 |
| RU | 2199990 | 3/2003 |
| RU | 2242208 | 12/2004 |
| RU | 2284558 | 2/2005 |
| RU | 2314070 | 1/2008 |
| RU | 2351305 | 4/2009 |

* cited by examiner

*Primary Examiner* — Scott J Sugarman
*Assistant Examiner* — Brandi Thomas
(74) *Attorney, Agent, or Firm* — Aleksandr Smushkovich

(57) ABSTRACT

Accommodative and vergence systems training method and multifocal ophthalmic lenses of Horizontal periodic or quasi-periodic Optical Power Stepless Alternating (HOPSA-lenses) therefor are proposed. Reading the text with HOPSA-lenses worn, while the head is stationary, provides a continuous alternating of accommodation and vergence strain/relaxation and, therefore, provides dynamic training of both systems. The method is applicable for human visual system therapy, eye diseases treatment/prevention and ophthalmology researches. The method enables combining the effective visual trainings with documents reading/processing, visual target examining, watching TV/video, playing computer games, etc., as well as combining the training with conventional vision correction. Several embodiments of HOPSA-lenses are disclosed, such as multi- and mono-cyclic, multi-layer, splitting the basic correction and training functions between lens' sides or layers, having left and right lenses' surfaces individually configured to provide the congruence of optical power for fixation, and/or the convergence invariability for fixation during the training.

20 Claims, 13 Drawing Sheets

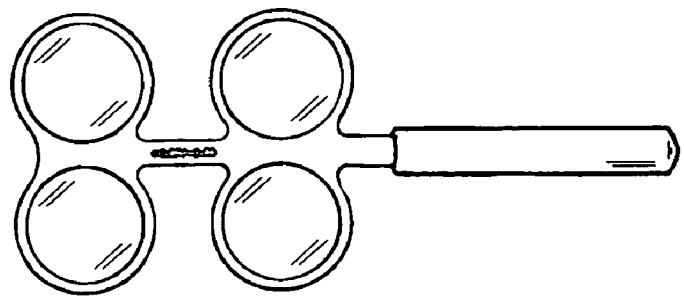
Fig. 1 - Prior Art
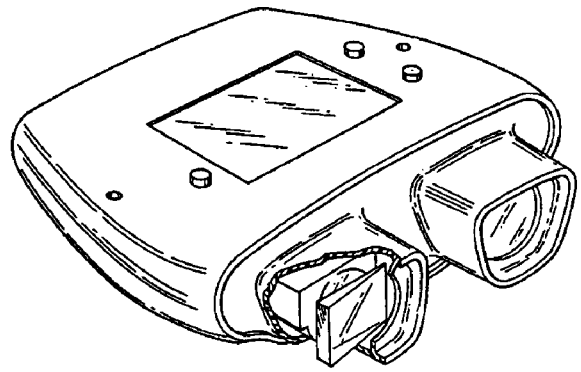
Fig. 2 - Prior Art
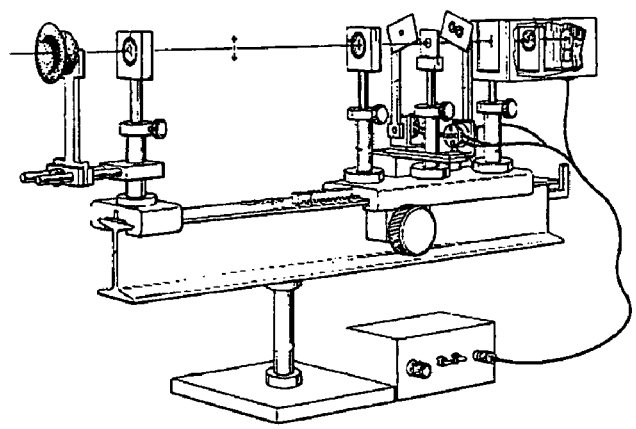
Fig. 3 - Prior Art

TRAINING METHOD FOR ACCOMMODATIVE AND VERGENCE SYSTEMS, AND MULTIFOCAL LENSES THEREFOR

FIELD OF THE INVENTION

The invention relates to training methods for improvement of vision and devices that can be employed for this purpose.

BACKGROUND OF THE INVENTION

1. Functional Background & Related Art

It is well known that the human accommodative system can be trained to improve its performance. The most considerable studies are mentioned in the "Borish's Clinical Refraction", see reference [1] (herein all reference numbers are included into rectangular brackets, and a list of the references is placed at the end of the present description).

Marg [7] showed that steady-state accommodation could be varied easily by volitional control in the presence of a target and related blur feedback. These results were later confirmed and expanded by others [2, 3, 8].

Using an objective recording system, Randle and Murphy [9] showed that with repeated testing (every 3 waking hours for 7 days; 3 hours total per day) of dynamic accommodative ability (predictable step and sine inputs), performance improved considerably.

These results are consistent with a clinical study by Levine et al. [10], which showed that only a few minutes per day of testing accommodative facility with ±2.00 D flippers produced considerable improvement in overall responsivity in asymptomatic young adults. The lens flipper with plus lenses on one side, and the minus lenses are on the other, is shown in FIG. 1—Prior Art.

Several studies have demonstrated that it is also possible to train and improve accommodation in symptomatic patients manifesting slowed dynamics. The first study was that of Liu et al., [11] who treated three optometry students with symptoms related to focusing difficulties at near using standard vision training procedures, including jump focus, plus-and-minus lens flippers, and pencil push-ups [12]. Subjects trained themselves at home, for 20 minutes each day for 4.5 to 7 weeks, and objective measurements of dynamic accommodation were made each week.

Initially, these measurements showed prolongation of the time constant and latency of accommodation. During treatment, the patients exhibited significant reductions in these two parameters that correlated well with reduction of symptoms. Flipper rates increased and symptoms were either markedly diminished or no longer present at the termination of therapy.

These results clearly demonstrate that vision training in this small sample of young adult patients resulted in objective improvement of accommodative function. The reduction in time constant suggested revision and improvement in the neuromotor control program [13] leading to a more efficient, time-optimal response. This might involve greater synchronization of neural signals related to the improved blur information processing. The reduced latency also suggested more efficient signal processing of blur information.

Two years later, these results were reproduced in children [14]. The adult results were also later confirmed and extended by Bobier and Sivak [15] using a different objective recording technique (photorefraction). They found no regression of improvement 4.5 months after cessation of training. In addition, subjective (minus lens) and objective (i.e., visual-evoked-response amplitude) increases in the amplitude of accommodation were recorded during a 4-month course of vision training in one patient [16]. Lastly, the slope of the accommodative stimulus-response function showed improvement after 8 to 16 weeks of basic accommodative therapy in a group of college students. This normalization was maintained when patients were retested 6 to 9 months later.

Together, results of the foregoing studies clearly demonstrate that symptoms related to near focusing were correlated with the clinical accommodative lens flipper rate [17-20]. Furthermore, objectively determined improvement in accommodative dynamics was paralleled by similar changes (i.e., increased timed cycles) in accommodative lens flipper rate.

Thus, in the clinical environment, the lens flipper ("accommodative rock") provides a simple, inexpensive, effective, and valid diagnostic and therapeutic indicator of overall accommodative dynamic ability. Combining this with careful static measures of accommodative amplitude (minus-lens technique or dynamic retinoscopy) and steady-state error of accommodation (i.e., near lag/lead, again using dynamic retinoscopy), practitioners can begin to obtain comprehensive static and dynamic clinical profiles of their patients' accommodative abilities [4, 21].

A few studies have shown that it is possible to train and improve accommodation in patients with other clinical conditions with verification using objective recording techniques or psychophysical test paradigms. In the area of amblyopia, Benjamin showed that both static accommodation and dynamic accommodation normalized after conventional vision therapy (part-time occlusion, eye-hand sensorimotor exercises, and lens flipper [22].

With regard to static accommodation, therapy resulted in reduced accommodative lag (and thus increased, more accurate response amplitude), reduced depth of focus, and increased accommodative amplitude [4, 5, 6, 23-26]. With respect to dynamic accommodation, therapy resulted in reduced latency, increased response amplitude (i.e., increased system gain), and more accurate accommodation, with less variability and improved response sustaining ability [22].

The amblyopia therapy improved neurosensory sensitivity and processing, as well as reduced the unsteady and eccentric fixation, all of which acted to improve overall static and dynamic accommodative function [22]. Similar findings were reported in a case of myasthenia gravis [27].

Also, one patient with congenital nystagmus achieved more accurate accommodation after eye movement auditory feedback therapy [28]. This probably resulted from reduced retinal image motion and therefore a higher contrast retinal image with more distinct edges to stimulate accommodation more effectively.

Since the effect of accommodative system training had been manifested, the training device, or apparatus, or other embodiment of accommodation training idea was brought to the fore.

The straightforward solution was to use the conventional procedures of accommodation measuring, along with the relevant equipment, for accommodative system training. The following tests are typically used for training the accommodative and vergence systems.

The representative procedure is the amplitude of accommodation measurement "push-up" or "pull away" test (Donder's Test). This test is destined to determine the maximum amount of accommodation that the eyes are capable of producing individually or together. The chart is pushed up until a blur is assured, and then the chart is pulled away until the patient can read the smallest line possible.

Accommodative Facility test is designed for determination of the accommodative system flexibility (Flipper Lens Test)—by rapidly alternating the viewing distance under monocular or binocular conditions. The lens flipper with plus and minus lenses is used.

Negative and Positive Relative Accommodation Test is designed for testing the patient's ability to decrease or increase the accommodation while maintaining convergence.

Special tests were designed for measuring of the Accommodative Convergence/Accommodation Ratio and Convergence Accommodation/Convergence Ratio; both tests are applicable for the training.

Retinoscopy may be used as well for the accommodative system measuring and training, for example, the Monocular Estimation Method of Dynamic Retinoscopy.

Monocular Estimation Method (MEM) of performing dynamic retinoscopy is an objective method of measuring accommodative lag and checking for accommodative or refractive imbalance at near.

All the aforementioned tests (and a number of similar ones) use the changing of lenses optical power and/or distance to a target in order to measure accommodative (and convergence) system abilities, and all these tests may be used for training the accommodative/vergence systems.

The disadvantage of deploying the enumerated above tests for training the accommodative system is their inconvenience for regular recurrent procedure of training. The known special equipment for accommodation measurements is complicate and expensive. One more inconvenience is the necessity of having an assistant for training.

Therefore, a number of attempts to create special equipment for accommodative system training were undertaken.

The functional background is illustrated in the following description of related art devices.

Slavin invented the "Spinning optics device" (U.S. Pat. No. 4,698,564, Oct. 6, 1987), which creates a specific visual phenomenon in front of one or both eyes of the person wearing the device. In this device, the lenses are constructed by cutting out and affixing stick-on type lens material, such as fresnel prisms, polarizing material, colored filters, cylinder prisms, reflective material, etc., to a plano-plastic disc. A drive motor rotates the rotating lens, which is held in registry with a stationary non-spinning lens by spectacle frames. The direction and speed of the motor are controlled by a digital computer containing a visual training program. The device was intended for visual trainings.

Mateik, et al. patented an "Eye training device" (U.S. Pat. No. 4,756,305, Jul. 12, 1988) for treating such visual disorders as strabismus, amblyopia, myopia, and accommodative insufficiency. The device is shown in FIG. 2—Prior Art attached to the present description. In that device, two images are displayed visually superimposable into a single image and optically conducts one of the images to a right eye viewing port and the other image to a left eye viewing port. The device is intended for enhancing accommodation in a patient.

Randle patented a "Visual accommodation trainer-tester" (U.S. Pat. No. 4,778,268, Oct. 18, 1988) for training a person to control volitionally his focus to his far point from a position of myopia due to functional causes. The perspective view of trainer-tester is shown in FIG. 3—Prior Art. It may be used to measure the accommodation, the accommodation rest position and the near and far points of vision. The device is utilized for various training purposes and test functions by following a series of procedural steps, and interchanging the apertures as necessary for the selected procedure.

Bronskill, et al. teach "Eye exercising devices" (U.S. Pat. No. 4,838,677, Jun. 13, 1989) for positioning the eye along an optical axis, which defines a range of accommodation for the eye. The range of accommodation is bounded by a proximal and a distal limit. An object is movable along the optical path and a displacement device is provided to displace continuously the object along the optical path from a first location on one side of a given one of the limits to a second location on another side of the given limit opposite the first location.

Cushman (U.S. Pat. No. 4,997,269, Mar. 5, 1991) suggested "Scheiner-Principal pocket optometer for self evaluation and bio-feedback accommodation training"—a method and optometer apparatus for measuring the accommodative state of eye of a person and for accommodation training. The optometer apparatus includes: a pinhole aperture plate having a center and a plurality of apertures in the pinhole aperture plate for viewing by the person's eye; a positive lens disposed near the pinhole aperture plate and having an optical axis coincident with the center of the pinhole aperture plate; and scaled means inclined away from the positive lens for indicating to the person the accommodative state of the person's eye in diopters.

Marshall invented a "Device and method for positioning and relaxing accommodation of the eye" (U.S. Pat. No. 5,293,532, Mar. 8, 1994)—apparatus and methods for relaxing accommodation of an eye undergoing examination or other optical or medical procedures while concurrently permitting and facilitating the positioning of a person's subject eye. A patch, cover, or other device designed to occlude and visually stimulate the eye opposite the subject eye includes multiple light sources facing the occluded eye. The practitioner illuminates a selected one (or ones) of the light sources within the patch and directs the patient to fixate on the source. As the occluded eye moves to fixate on the illuminated source, the subject eye follows the movement, thereby repositioning itself. Occluding the eye causes the image seen by it to appear to be at infinity, rather than nearby, causing the ocular muscles of both eyes to relax.

Miyake, et al. patented a "Visual training method and visual training device" (U.S. Pat. No. 7,306,335, Dec. 11, 2007). In a visual training device and a visual training method, different targets are displayed for right and left eyes, respectively, and refractivities of the right and left eyes are measured. Based on the measured refractivities of the eyes, positions of the targets displayed for the right and left eyes are moved in the directions of the respective optical axes. At the same time, the targets are moved so that the visual axes of the right and left eyes incline outward toward the end. The directions of the visual axes of the right and left eyes incline outward toward the end, so that it is possible to relax the strain of musculus ciliaris and relieve visual fatigue through short, effective training.

Yee suggested the "Training enhanced pseudo accommodation methods, systems and devices for mitigation of presbyopia" for and/or treating presbyopia (U.S. Pat. No. 7,413,566, Aug. 19, 2008). Herein, a combination of an alteration to the refractive tissues of the eye with changes in the response of the visual system may be used. The visual system response may include using residual accommodation in a manner similar to that employed by latent hyperopes, a trained response of the pupil, trained psychophysics, or the like. Associated refractive prescriptions may be tailored to take advantage of the subsequent visual system response so as to mitigate presbyopia.

All the aforesaid devices are functionally effective for training the accommodative system, but possess the following disadvantages: equipment/accessories complexity; cumbersomeness; expensiveness; special time/place for training procedure; inconvenience for unaided training (self-training), etc.

In all of the mentioned devices, the main functioning principle remains invariable: alternating the lens optical power and/or distance in order to change the accommodative system strain. The process of changing the strain of eyes is the essence of accommodative system training.

2. Design Background & Related Art

Progressive lenses, or progressive addition lenses (PAL), or varifocal lenses, or multifocal lenses—are corrective lenses used in eyeglasses to correct presbyopia and other disorders of accommodation.

The first patent for a PAL was a British Patent GB15735, granted to Own Ayes with a 1907 priority date. Ayes' patent included the progressive lens design and the manufacturing process. Unlike modern PALs, it consisted of a conical back surface and a cylindrical front with opposing axes in order to create a power progression.

While there were several intermediate steps (H. Newbold appears to have designed a similar lens to Ayes around 1913), Duke Elder developed the world's first commercially available PAL in 1922. This was based on an arrangement of aspheric surfaces.

The first PAL of modern design was a so-called Varilux lens. It was developed by Bernard Maitenaz, patented in 1953, and introduced by the Société des Lunetiers (that later became part of Essilor) in 1959.

Early progressive lenses had relatively crude designs. Modern PALs have gained greater patient acceptance and include special designs to cater to many separate types of wearer application: for example lenses may be customized for use with computers, or to offer enlarged near and intermediate view areas. Over the 1980s through today, manufacturers have been able to minimize unwanted aberrations by improvements in mathematical modelling of surfaces; extensive wearer trials; improved manufacturing and lens metrologic technology.

The design background of present invention is illustrated by the following description of progressive addition lenses (PAL) taught in the related art.

A representative sample of conventional progressive lenses is described in U.S. Pat. No. 4,606,622, Aug. 19, 1986, wherein FueGerhard, et al. (Carl Zeiss) discloses a multifocal spectacle lens with a dioptric power varying progressively between different zones of vision. Having a short progressive zone, this lens substantially satisfies in the progressive zone as well as in the far-vision and near-vision zones all requirements (monocular and binocular) for sharpness and compatibility, while reducing horizontal and vertical directional errors to tolerable values by selecting distortion on both sides of the principal sight line accordingly.

The very significant PAL parameters are: a progressive corridor length and a progressive corridor width. Wehner, et al. (Rodenstock) patented a double progressive spectacle lens in which a first prescribed progressive surface can be freely designed (U.S. Pat. No. 7,300,153, Nov. 27, 2007). The second progressive surface is then optimized in relation to the first prescribed surface. Thereby, the resulting spectacle lens avoids the need to employ a classic hourglass design progression zone and produces optical and geometric advantages such as an overall height of the progressive lens. In that patent, the use of both internal and external lens sides for progressive surfacing is illustrated.

Guilloux, et al. (Essilor) suggested a method for manufacturing an ophthalmic progressive addition lens with customized design features adapted to a wearer (US Pat. App. 20100079722, Apr. 1, 2010), including a method for determination of a customized ophthalmic progressive addition lens with customized design features. This is one of the most recent samples of freeform surfacing application.

Using the multi-layer technology extended the possibilities of PAL design. Bonnin; Thierry; et al. (Essilor) described an ophthalmic lens that comprises an optical component and a layer placed on its face (US Pat. App. 20080198325, Aug. 21, 2008). The layer has a variable refractive index and is structured so that a second order derivative of the index with regard to a linear spatial coordinate along the face of the optical component is greater than a fixed threshold. The additional layer makes it possible to alter the optical power and astigmatism of the lens with regard to corresponding values only relative to the optical component. For a progressive lens, the additional layer makes it possible to change an addition, a length of progression, and/or a design of the progressive lens.

Nowadays, the complex surfaces of a modern progressive lens can be cut and polished on computer-controlled machines, allowing "freeform surfacing", as opposed to the earlier casting process.

Since freeform techniques implementation, it has become possible to design and manufacture the multifocal (progressive) lenses of complex surfaces, of customized design. Along with multi-layer technologies, freeform technique defines the modern progressive lenses design limitations. Having regard to these limitations, the customized progressive lens may be ordered from a majority of lens manufacturers (Essilor, Zeiss, Rodenshtock, Hoya, Seiko, Shamir, etc.).

An example of multifocal lenses has been described in U.S. Pat. No. 7,540,610 issued on 2 Jun. 2009 to Carimalo et al: "The invention concerns an ophthalmic lens having a complex surface, with a substantially umbilical meridian and an average sphere progression ranging between 0.50 diopter and 0.75 diopter. The lens is prescribed for esophoric and non-presbyopic users. The lens is prescribed as a standard unifocal lens. Through the presence of the average sphere progression, the user is less adapted to near vision, thus compensating for his/her esophoria".

The related art is however silent as to employing the multifocal lenses for training the accommodative and vergence systems of a human.

AIMS AND BRIEF SUMMARY OF THE INVENTION

It is proven irrefutably that the accommodative and vergence systems can be trained to improve their performance. However, either the complex, cumbersome and expensive equipment, or/and the professional assistance are needed for the training procedure implementation. At that, the state-of-the-art training methods and equipment are available mostly with stepped changing of optical power. This impedes wide applications of the mentioned known methods.

Therefore, a first aim of this invention is to propose a method that would allow avoiding the aforesaid shortcomings, and would provide a simple and inexpensive way for training the accommodative and vergence systems.

A second aim of this invention is to provide a device for carrying out such method. Other aims of the invention may become apparent to a skilled artisan upon learning the present disclosure.

These aims have been achieved by the inventive method and device disclosed herein below. The inventive method for training the accommodation and vergence systems is based on continuous dynamic alternating the strain(s) of accommodative and vergence systems during lateral eyes movements taking place in the processes of reading, or visual examination of a target (that can be a near, far, or intermediate equidistant target) employing an inventive device, herein called a 'HOPSA-lens', specifically designed for carrying out the inventive method. For example, reading a target text with HOPSA-lenses worn, while the head is stationary, provides the continuous alternating of accommodation and vergence strain/relaxation and, therefore, provides dynamic training of the systems.

The inventive method and the respective HOPSA-lenses are applicable for human visual system therapy, eye diseases treatment/prevention and ophthalmology researches. The method is applicable for treating Presbyopia, Asthenopia and other eye diseases related to the accommodative insufficiency; it may be helpful for treating the Computer Vision Syndrome (CVS). Trainings with HOPSA-lenses increase the fusional reserves; improve the retinal and uveal circulation; affect the systemic fluid and water balance; and provide the salutary influence of other kinds.

The invention proposes an essentially different way to implement the training of the accommodative and vergence systems, with equal or higher efficiency, with wider range of control, and with the possibility of convenient self-training without any professional assistance.

The inventive method makes it possible to combine the effective visual training with the ordinary documents reading/processing, both hard copies and computer ones, or with playing computer games, etc.

According to the invention, the HOPSA-lens is a multifocal ophthalmic lens having predetermined periodic or quasi-periodic variations (changing) of the optical power substantially along a horizontal progression meridian, while the optical power along a vertical meridian is generally invariable for each vertical profile of the lens.

The HOPSA lenses are properly secured in a retainer device (such as an appropriate kind of frame, etc.) suitable for wearing by a person (patient) subjected to the training.

Herein, a 'horizontal progression meridian', or simply a 'horizontal meridian', means a straight line extending through the geometrical center of the lens, substantially horizontally in relation to the retainer device. In reality, the horizontal meridian may have a predeterminedly admissible deviation, preferably within an angular range of ±5 degrees from the horizontal meridian.

All HOPSA-lenses are symmetric with respect to the horizontal plane (this kind of symmetry is known as 'vertical symmetry') extending through the geometrical center of the lens. The axis of vertical symmetry coincides with the lens' horizontal meridian. A majority of HOPSA lenses can be also made symmetric with respect to the vertical plane (this kind of symmetry is known as 'horizontal symmetry') extending through the geometrical center of the lens, which will be discussed herein further.

The horizontal meridian has been chosen since: (a) reading is one of the most often and natural actions performed by human beings in the modern society; and (b) this action is most frequently related to the lateral movement of the eyes, along the horizontal meridian.

One of the most significant requirements for conventional multifocal lenses is to reduce the horizontal varying of accommodation and convergence strains as much as possible. Hence, the principal difference between the conventional progressive lenses and the HOPSA lenses is that the conventional progressive lenses are aimed to eliminate the variations of horizontal optical power inside the lens working zones (i.e. to avoid the changing of accommodative and convergence strains during the horizontal eyes excursions); whereas, the HOPSA lenses, on the contrary, are aimed at utilization of controllable varying the horizontal optical power and prism balance. This capability of HOPSA lenses has provided the physical basis for the present invention.

It is known that a conventional multifocal lens has a near vision (typically, lower) zone (also called an N-zone in this description), a far vision (typically, upper) zone (also called an F-zone in this description), and an intermediate vision zone (or a 'transitional corridor', or a 'progressive corridor') therebetween. It is also known that the distance between the pupils (also known as an 'interpupillary distance') for the near vision differs from the one for the far vision. This difference can amount up to 4 mm and it conditions the design for multifocal lenses: they are made asymmetrical relatively to any axis. Thusly, a symmetrical lens is generally outlawed by the nowadays' concept of conventional multifocal lenses, except for the above cited U.S. Pat. No. 7,540,610 (Carimalo et al).

Another important aspect of the present invention is the convenience training the accommodative and vergence systems. The inventive method is also distinct from the conventional training methods in that: —the varying of accommodation and vergence strain is provided in a step-less smooth manner, while employing only one HOPSA lens (some known methods also encompass a step-less varying of the strain, but made with the help of a plurality of specially selected lenses and respective complex devices for their positioning); —the training exercises are systematic and utilize a single pair of lenses; and—the intenseness of training is greater than the one for known related art devices and methods.

Yet, another aspect of the present invention is that it allows for providing the training exercises during usual human activities, such as examining a visual target or reading any text, without a need for assistance of another person, including an eye training specialist. The subjected person gets the training in a natural way of viewing objects/text; he/she just reads the text and simultaneously receives the background training. The aforementioned features of the inventive method are realized due to a special design of the inventive HOPSA lenses.

In summary, there are proposed a method for training the accommodative and vergence systems, and multifocal ophthalmic lenses of Horizontal periodic or quasi-periodic Optical Power Stepless Alternating (HOPSA-lenses) deployable for the training. Reading the text with HOPSA-lenses worn, while the head is stationary, provides a continuous alternating of the accommodation and vergence strain/relaxation and, therefore, provides dynamic training of both systems. The method is applicable for human visual system therapy, eye diseases treatment/prevention and ophthalmology researches. The method enables combining the effective visual trainings with documents reading/processing, visual target examining, watching TV/video, playing computer games, etc., as well as combining the training with conventional vision correction. Several embodiments of HOPSA-lenses are disclosed, such as: multi- and mono-cyclic; multi-layer; dividing the alternating and integrating functions between lens' sides or layers; having left and 'right lenses' surfaces individually configured to provide the congruence of optical power for fixation, or the convergence invariability for fixation during the training; etc.

BRIEF DESCRIPTION OF THE DRAWING

FIGS. 1-3—Prior Art are general views of samples of the functional related art.

FIG. 12 illustrates the shifting of a clear vision zone and respective accommodative responses while reading the text using a pair of identical HOPSA-lenses depicted on FIG. 8a.

DETAILED DESCRIPTION OF THE INVENTION

Terminology

Figure 4:
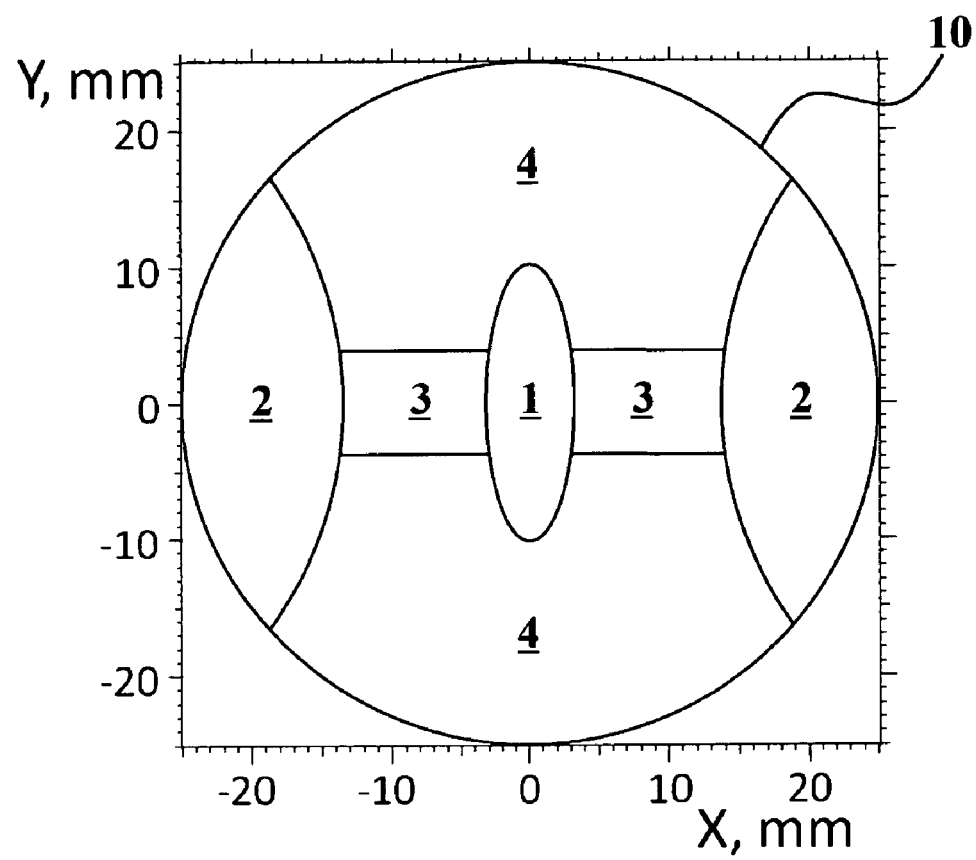
FIG. 4 is a schematic plan view of a basic mono-cycle HOPSA-lens.

The following terms used in the present disclosure have the meanings indicated herein below:

A 'HOPSA-lens' is defined as a multifocal lens with Horizontal Optical Power Step-less Alternating (or varying).

'Main (or Principal) Meridian' (MM) is defined as the horizontal meridian of the lens.

Optical Power (OP) stepless alternating is considered as the progressive, cyclic, or pseudo-cyclic change of a mean sphere substantially along the MM.

A mean sphere along the vertical meridian (VM) is considered to be stable for each vertical profile of the lens, i.e. having no changes (or having minimal changes—technologically achievable) along the VM for every point of MM.

The terms 'horizontal' or 'vertical' are used relative to the position of the lens in a retainer device (e.g. frame) unless otherwise stated in the description.

Basic Optical Power of HOPSA-lens (BOP) is defined as the reference mean sphere of the lens.

Progression Length (PL) is defined by analogy with the progression length of the progressive multifocal lenses. The mean sphere progression (or the difference between the maximum value and the minimal value of the mean sphere of adjacent lens zones) is considered substantially along the main meridian.

Progressive Corridor, Power Addition (ADD), Distance (Far) Zone, and Near (Reading) Zone, etc., are considered in the same meanings as if it would be used for conventional progressive lens description.

A 'cycle of horizontal optical power alternating' is defined as a mean sphere changing from any local extremum to the next one of the same type (i.e. between two minimums or two maximums); a 'cycle length' is a distance (mm) between these extrema along the MM. According to the invention, HOPSA-lens may contain more than one cycle, or may contain a portion of the cycle.

The Concept of HOPSA-Lens

The concept idea of HOPSA-lens is the stepless changing of the lens optical power substantially along the horizontal meridian. The changing of angles of the gaze through the HOPSA-lenses due to horizontal shifting of a point of fixation while the head is stationary, or due to turning the head to the right or left while the visual target is stationary, entails the respective changes in accommodative and convergence demands. If the visual system is capable of responding to these demands adequately, the respective alternating of accommodative and vergence systems strain may be used for the dynamic training of both systems.

A HOPSA-lens simulates the changing of distance from the eyes to the visual target, depending on the angle of the gaze with respect to a forward gaze direction (also called a 'straight-ahead' gaze direction), during the visual examination of the target (for example, during reading the text lines with HOPSA-lenses worn, while the head is stationary).

The objective of HOPSA-lens surfaces design is to achieve a stepless changing of the mean sphere along the horizontal meridian while keeping the mean sphere invariable for each vertical profile of the lens.

The HOPSA-lenses of any design described below can be ordered from a majority of lens manufacturers and can be made using the conventional progressive lenses free-form technology.

In order to simplify the description, the case of a simple HOPSA-lens containing only one full cycle of horizontal optical power alternating, is considered and defined as a 'Sample HOPSA-lens'. The HOPSA-lenses containing a different number of cycles are described below, in the section of Embodiments Description.

A principle scheme of the simple one-cycle HOPSA-lens design (plan view) is shown in FIG. 4.

A blank lens 10 preferably has a diameter of 50 mm. A central area 1 of the blank is an N-zone, i.e. a zone of full near vision correction (that corresponds to the near vision zone of a conventional progressive lens). The central area is made based on a predetermined mean sphere.

Side areas 2 are zones of the basic optical power (BOP). Each side area 2 in this case is made based on a mean sphere less than the mean sphere of the central area. Each side area 2 is an F-zone, and corresponds to the 'far vision zone' of a conventional progressive lens.

Transitional areas 3 (also known as an 'intermediate vision zone' or a 'transitional corridor', or a 'progressive corridor' in a conventional progressive lens) are zones of progressive change of the current mean sphere. The areas 4 are zones of significant undesirable astigmatism. A line 5 represents the shape of HOPSA-lens.

Figure 5:
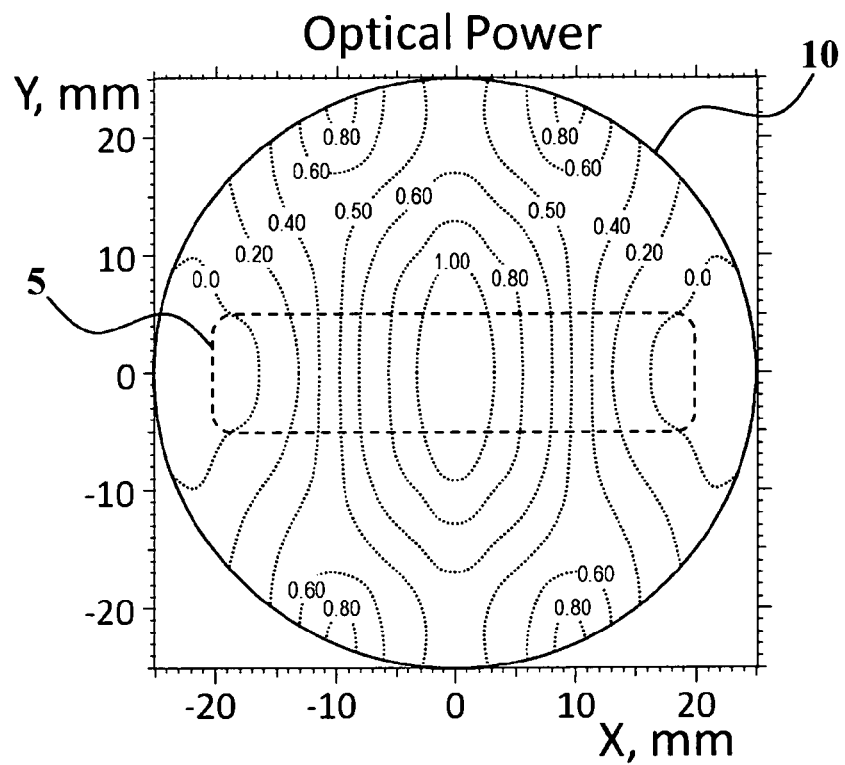
FIG. 5 is a contour map of optical power distribution in a mono-cycle HOPSA-lens.

Mean power distribution in the Sample HOPSA-lens is shown in FIG. 5 over iso-mean power lines. The line 5 is the shape of HOPSA-lens. A blank lens shape 10 is shown to clarify the mean power distribution.

Figure 6:
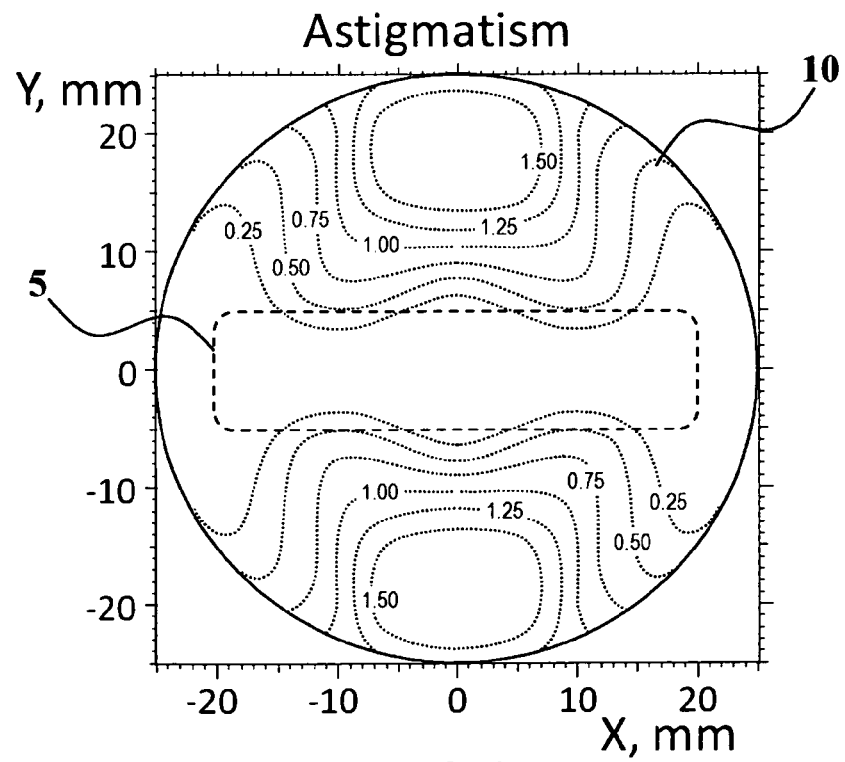
FIG. 6 is a contour map of astigmatism distribution in a mono-cycle HOPSA-lens.

Astigmatism is an unavoidable consequence of variable mean power. Astigmatism distribution in the Sample HOPSA-lens is shown in FIG. 6 over iso-astigmatic lines. The line 5 is the shape of HOPSA-lens. A blank lens shape 10 is shown to clarify the astigmatism distribution.

The dimensions of the HOPSA-lens working zone are determined by a functional prescription (herein also called 'assignment'). Boxing dimensions of the Sample HOPSA-lens are 40*10 mm. These dimensions are satisfied for the accommodative and vergence systems training during working at the monitor of 400+ mm width (working distance is 400 mm).

A technologically achievable progression length of state-of-the-art short-corridor progressive lenses is typically less than 14 mm (ADD=3.0 D) and less than 10 mm for ADD=1.0 D. Therefore, the dimensions of Sample HOPSA-lens zones: the central zone of 4 mm width; two basic optical power (BOP) zones of 4 mm width (each); and two progressive zones of 14 mm width (each)—can be easily realized on a single summary lens' width of 40 mm, even using the low refractive index material (such as CR-39) and using only one side of the Sample HOPSA-lens. Most of progressive lens manufacturers are able to produce the HOPSA-lenses using the free-form technology just today.

It is noticeable that the HOPSA-lens progressive corridor is wider than it would be in conventional progressive lens of the same addition power (ADD), due to a drastically decreased width of the far and near vision zones (in terms of a conventional progressive lens description, by analogy). Therefore, the readymade Sample HOPSA-lens is almost free from astigmatic distortions.

Figure 7:
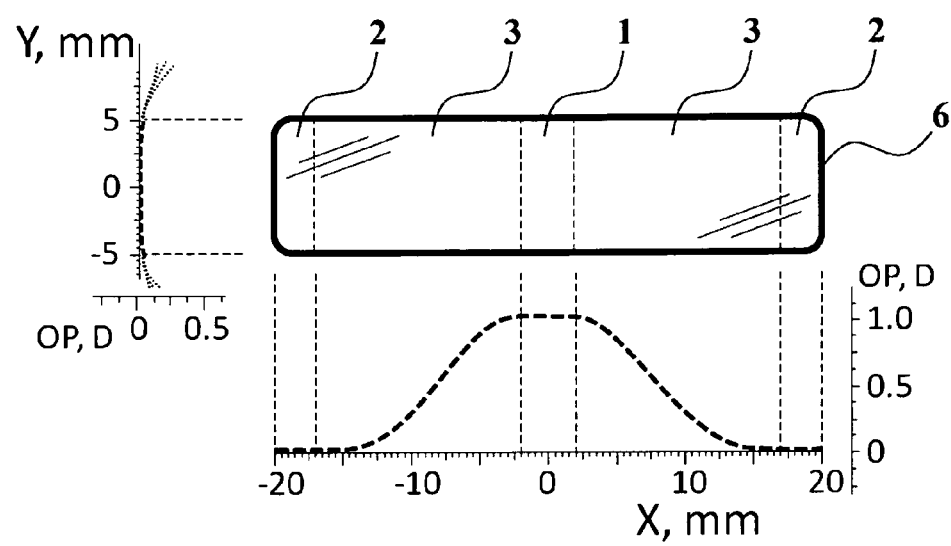
FIG. 7 is a graph of mean power distribution along the horizontal and vertical meridians.

The mean power distribution along the horizontal and vertical axes of HOPSA-lens 6 is shown in FIG. 7. Area 1 is an N-zone, areas 2 are F-zones, areas 3 are the progressive corridors.

Figure 8A:
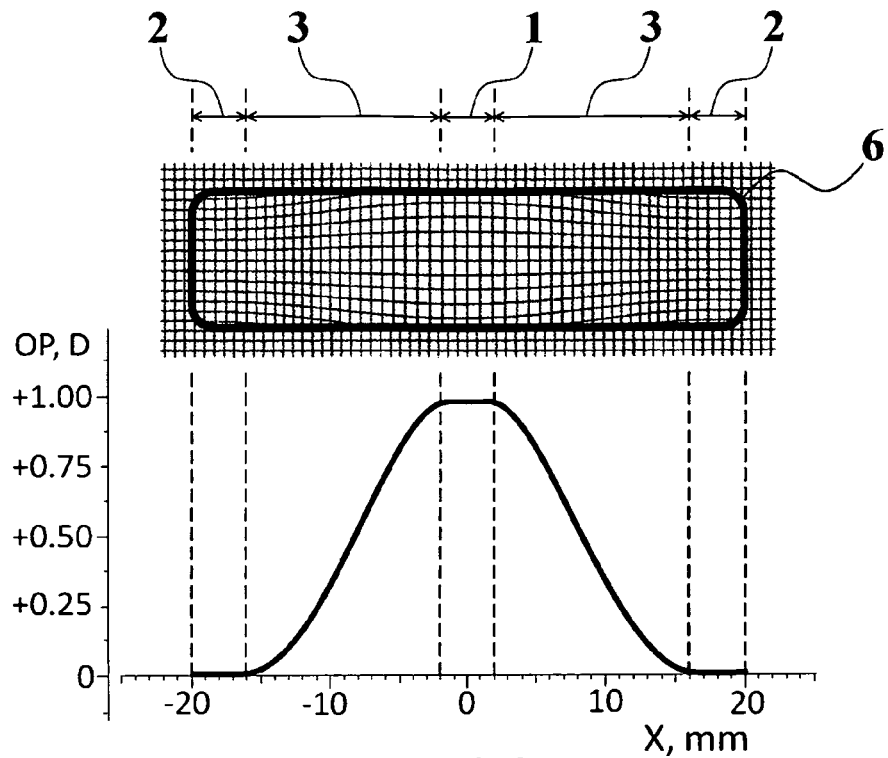
FIGS. 8a-8h illustrate the graphs of mean power alternating along the horizontal principal meridian for a sequence of embodiments of the present invention.

FIG. 8a is a plan view of a cut-out Sample HOPSA-lens 6 against a grid background. The distortions values are exaggerated intentionally, in order to demonstrate the HOPSA-lens principle. FIG. 8a shows a distribution of the N and F zones. Area 1 is an N-zone, areas 2 are F-zones, areas 3 are progressive corridors.

The sample process of accommodative training can be simple: a person subjected (herein also called 'subject') to training is reading the text, or processing the document, or even playing the computer game—with HOPSA-lenses worn, straight against the monitor's center, trying not to turn the head to the left or right. During this process, the continuous stepless alternating of eyes accommodation and vergence strain/relaxation takes place and, therefore, the dynamic training of both systems is provided.

The accommodation is mostly driven by central vision. It is noteworthy that any HOPSA-lens has a zone of full correction for a predetermined distance—so the patient may check the recognizability of image details at any time by directing the gaze through this zone (slight head turning to the left or to the right may be needed).

Initially, HOPSA-lenses were considered as a tool for the accommodative system training only, without vergence system training. It was however understood that reading with the HOPSA-lens worn, would involve a simultaneous varying of convergence strain.

It was also conventionally considered that varying the convergence was useless, objectionable, and even potentially hazardous to vision health, and that it had to be eliminated. However, it was later discovered unexpectedly, during the clinical trials, that the vergence system could be effectively trained with HOPSA-lenses as well, especially in the context of fusional ability improving and recovery of the balance between accommodation and accommodative convergence strains. Since the effect of vergence system training was confirmed practically, it is included to the current invention framework.

The Sample HOPSA-lens provides the dynamic vision training with the accommodative amplitude of 1.0 D and with strain/relaxation frequency of approximately 5÷30 cycles per minute. This text, the reader is presently reading, is fully typed and processed with a HOPSA-lens worn. The reading of this document with the Sample HOPSA-lens provides more than 700 cycles of accommodative strain/relaxation during 1 hour.

Generally, the HOPSA-lens is duly secured in a retainer device suitable for wearing by the person subjected to the training being placed in front of his/her eyes. It has a variable optical power, a geometrical center, and a horizontal meridian extending through the geometrical center substantially horizontally in relation to the retainer device with a predetermined deviation. Structurally, the HOPSA-lens comprises: —a predetermined number N of near vision zones, called N-zones, each said N-zone has a center located on the horizontal meridian and predetermined dimensions; —a predetermined number F of far vision zones, called F-zones, each said F-zone has a center located on the horizontal meridian and predetermined dimensions. Each F-zone is adjacent along the horizontal meridian to at least one N-zone and vice-versa, thereby forming an N-F pair of zones; and—a respective number of transitional corridors having predetermined dimensions, each transitional corridor is disposed between the F and the N zones of each said N-F pair. This structure results in that the optical power steplessly alternates substantially along the horizontal meridian within the HOPSA-lens from any N zone to the corresponding adjacent F zone and vice-versa.

The Accommodative and Vergence Systems Training Method

The method of dynamic training of accommodative and vergence systems with HOPSA-lens comprises the following steps: (1) providing at least one HOPSA-lens according to the description above, the HOPSA-lens is duly secured in a retainer device suitable for wearing by the person; (2) setting up the retainer device with the HOPSA-lens on the person's head in front of his/her eyes; (3) carrying out the training in one of the following ways: —either: (3a)—setting the person's head in a stationary position; and—performing visual activity associated with lateral shifting the person's point of fixation on a visual target, while looking through the HOPSA-lens; wherein the visual activity is selected from the group consisting essentially of: reading, document processing, watching video/TV, and playing computer games; —or: (3b) setting any visual target in a stationary position; and turning of the head to the left or right while holding the person's fixation on the stationary visual target; —or (3c) any combination of the steps (3a) and (3b).

The above described method may further comprise a set of preliminary steps preceding the step (1); this set of preliminary steps may include:

(a) preliminary examination of a patient's eyes (the 'patient' herein means a person to be subjected to the training), including the conventional entrance tests (external examination, visual acuity, cover test, stereopsis, extraocular motilities, interpupillary distance, etc.) and accommodative and vergence systems tests (amplitude of accommodation measured objectively and subjectively, negative and positive relative accommodation, accommodative convergence/accommodation (AC/A) ratio, relative convergence, horizontal vergence ranges at distance and at near, fusional vergence functionality and reserves, etc.). The dynamic accommodative characteristics (time constant, latency, flipper rate) may be included if they are indicated. The objectives of preliminary examination are: determination of any limitations for the intensity of accommodative and vergence systems training, and fixation of the current state of these visual systems for subsequent control of the training efficiency;

(b) setting forth objectives of the training for the patient (it may be the physiotherapeutic procedure, prophylactic goals, eye disease treatment, occupational/professional goals, certain ophthalmology study objectives, etc.);
(c) determining an acceptable level of the training intensity using data obtained from the steps (a) and (b);
(d) determining a configuration and dimensions of a HOPSA-lens to be prescribed to the patient, using data obtained from the steps (a), (b), and (c);
(e) selecting a retainer device for the HOPSA-lenses chosen for the patient (a 'retainer device' herein means any device capable of properly securing HOPSA-lenses that is suitable for wearing by the person subjected to the training);
(f) adjusting the retainer device (i.e. adjusting the retainer device's parameters, such as: vertex, interpupillary distance, faceform, etc. in accordance with the patient's physical characteristics);
(g) explanation of the training procedure to the patient (including the reasons and symptoms for training cancellation); and
(h) trial simulation of the real training process.

The method may further comprise a follow-up step conducted after the step (3); wherein the follow-up step may consist of periodic examinations of the person's visual systems, or, in the other words, monitoring the patient's visual system health.

When and if the difference between the monitored amplitude of accommodation increases 0.5 D or more, it may become a sufficient reason for training intensification by increasing the HOPSA-lenses ADD, frequency, and/or trainings' duration.

A HOPSA-lens retainer device meant for Computer Vision Syndrome (CVS) elimination only should not generally require any changes.

The embodiments of HOPSA-lenses and retainer devices providing the possibilities of training parameters change, as well as design options, are enlightened in the following two sections.

SUMMARY OF EXEMPLARY EMBODIMENTS OF THE INVENTION

While the invention may be susceptible to embodiment in different forms, there are described in detail herein below, specific embodiments of the present invention, with the understanding that the present disclosure is to be considered an exemplification of the principles of the invention, and is not intended to limit the invention to that as illustrated and described herein.

The embodiments of present invention may generally include a number of variations, which variations can essentially be divided into: the HOPSA-lens variations; the retainer device variations; the ways of combining the basic refractive correction with the accommodative/vergence training; and the training methods variations.

The HOPSA-lens variations can be described with regard to the following parameters:
(A) a number of cycles of optical power alternating—the range is 0.5÷3.0 preferably, but not limited;
(B) an optical power amplitude absolute value—0.5÷3.0 D preferably, but not limited;
(C) an optical power amplitude regularity—if number of cycles is >1, optical power amplitude can be constant or variable;
(D) a direction of progressive increasing the optical power (ADD)—positive, negative, and mixed;
(E) a difference between the left and right HOPSA-lenses—the surfaces of the left and right lenses can be either identical or computed individually, to provide the congruence of optical power and/or the convergence invariability—for each point of the horizontal principal meridian of the left and right lenses, with respect to the visual training distance;
(F) an optical properties distribution between two lens sides (see U.S. Pat. No. 7,300,153 hereby entirely incorporated by reference), or among the lens layers, if the multilayer technology is applied for lens manufacturing (see published US Patent Application 20080198325 hereby entirely incorporated by reference); and
(G) a prescription method may provide for a standardized HOPSA-lens (basic optical power stepped 0.25 D; ADD stepped 0.25 D), or a customized HOPSA-lens (individually computed optical powers and ADDs).

The retainer devices furnished with HOPSA-lenses may include:
(H) HOPSA-lenses spectacles or another embodiment of the retainer device, wherein at least one HOPSA-lens is used as the main optical element; and
(I) HOPSA-lenses add-on clip (or "clip-on"), wherein at least one HOPSA-lens is used as the main optical element.

The functional combining of the basic refractive correction with the accommodative/vergence training may include:
(J) a functional superposition of basic correction and training—inside an integral HOPSA-lens (built-in HOPSA-lens training function); this integral HOPSA-lens can be considered as a HOPSA-lens augmented with the conventional basic refractive error correction capability; and
(K) a functional distribution of basic correction and training between the conventional lenses and the HOPSA-lenses (separated HOPSA-lens training function); such an embodiment results in a visual apparatus including a pair of regular correction lenses and a pair of HOPSA-lenses, wherein the pairs (A) can be secured in one retainer device; or (B) the conventional lenses can be secured in a conventional frame installed behind the retainer device; or (C) the conventional lenses can be contact lenses properly placed in front of the person's eyes.

The training methods variations may include:
(L) ways of utilization of HOPSA-lens properties: "fixed head—moving target"; "fixed target—turning head"; and a combination of the aforesaid two ways;
(M) target types: "natural" (i.e. usual documents, environmental objects, etc.); "special" (i.e. target properties satisfy special requirements, such as document font size, line length, etc.); "mixed" (i.e. combination of said target types); and
(N) training mode: "purposeful training" (can be called: the training process is "an end in itself"), i.e. specifically performed training exercises; "background training" (can be called: the training process is not "an end in itself"), i.e. performing the training exercises while carrying out a normal activity, such as reading, visual examining an immovable target, etc.; a combination of the aforesaid two modes.

DETAILED DESCRIPTION OF ILLUSTRATIVE EMBODIMENTS OF THE INVENTION

The items of Detailed Description correspond to the items of Summary of Embodiments above, as follows below.

The HOPSA-lens variations may include:
(A) A Number of Cycles of Optical Power Alternating.
The basic HOPSA-lens is mono-cycle; it has one full cycle of optical power (OP) alternating: increasing from the basic OP (left edge of the lens) to the maximum OP (lens central zone) and decreasing back to the basic OP (right edge of the lens), as it is shown in FIG. 8a. Herein the difference between the maximum OP and the basic OP is the HOPSA-lens 6 OP amplitude. This lens design provides one cycle of accommodative system strain/relaxation during, for example, reading each line of the text. At that, the width of the text should correspond to the width of lens progressive zone. The ratio of the text width, which is visible through the progressive zone, to the whole text width, should be approximately 0.8±0.1. Otherwise, the OP amplitude will not be utilized wholly.

Figure 15:
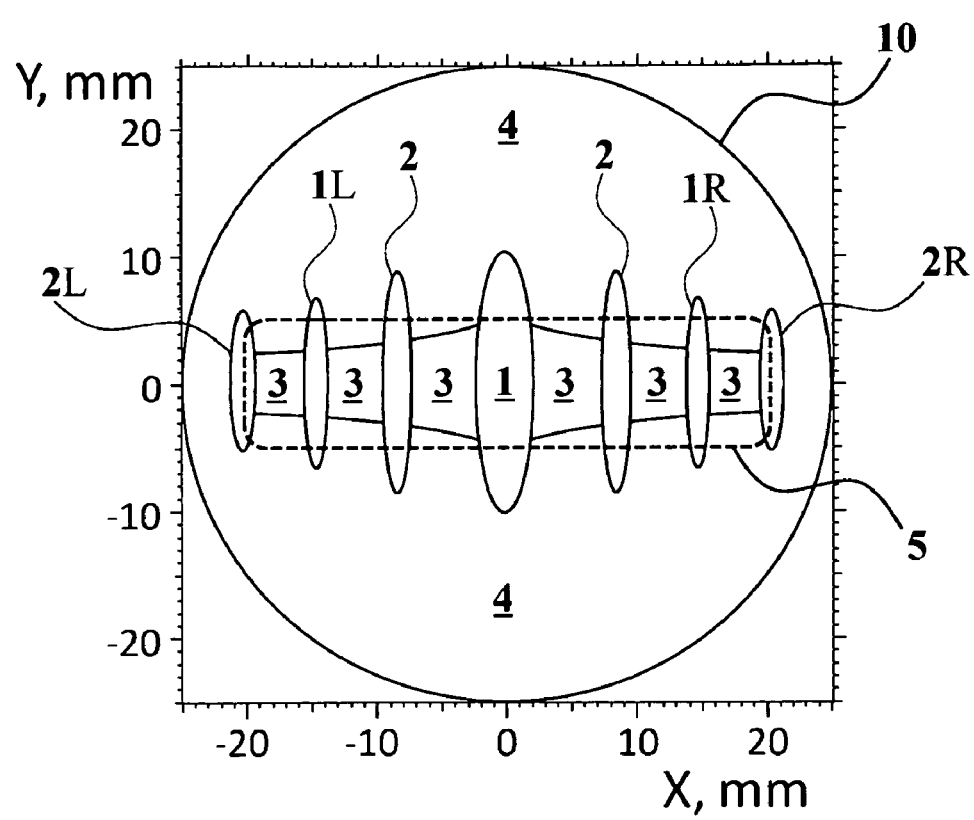
FIG. 15 is a schematic plan view of a three-cycle HOPSA-lens, which corresponds to the graph of mean power alternating shown on FIG. 8f.

FIG. 15 shows an embodiment of the inventive HOPSA-lens having three cycles of optical power alternating. Herein, there are shown one central N-zone 1, two side N-zones 1L and 1R (for the left and right sides respectively), two side F-zones 2 proximate to the central N-zone 1, and two side F-zones 2L and 2R (for the left and right sides respectively) remote from the central N-zone. Areas 3 are progressive corridors. Preferable dimensions (in mm) of the base lens 10 are also specified on FIG. 15. The OP alternating distribution for this embodiment corresponds to the graph of mean power alternating shown on FIG. 8f with the respective references.

Multiplying the cycles is aimed at the HOPSA-lens full efficacy, for example, when reading any text of conventional width, such as hard copies of documents or electronic documents on a narrow screen. In this case, the whole text is visible through a part of the lens only. Actually, 12÷18 mm of the lens central zone is used in most such cases. Narrowing the cycles makes it possible to combine the training process with the conventional document processing. A sample of HOPSA-lens containing 3 cycles of OP alternating is illustrated in FIG. 8f.

On the other hand, the multiplying of the number of cycles provides a wide variety of accommodative system training modes.

The number of cycles is generally integer and odd. For special needs, such as certain modes of training, the multi-cycle HOPSA-lens may contain an even number of cycles, for example, 2 or 4, or a non-integer number, for example, 1.5 cycles. The OP distribution in HOPSA-lens 6 containing two cycles of OP alternating is shown in FIG. 8e. Area 1 is an N-zone, areas 1L and 1R are two side N-zones (for the left and right sides respectively), areas 2 are F-zones, areas 3 are progressive corridors. The OP distribution in HOPSA-lens 6 containing 1.5 cycles is depicted in FIG. 8g. Area 1 is an N-zone, areas 2 are F-zones, areas 3 are progressive corridors.

A particular sub-case of multi-cycle HOPSA-lenses is a half-cycle lens. FIG. 8h shows a graph of OP distribution in an embodiment of the HOPSA-lens 6 with a half-cycle of OP alternating. The half-cycle HOPSA-lens has one N-zone 1 and one F-zone 2, which zones are located symmetrically relatively to the vertical axis of symmetry of the lens. Areas 3 are progressive corridors.

The inventive HOPSA lenses are intentionally made vertically symmetric relatively to the horizontal meridian. Therefore, any conventional multifocal lens being turned at a 90 degree angle would have a vertically asymmetric optical structure significantly different from the inventive half-cycle HOPSA lens.

(B) An Optical Power Amplitude Absolute Value.

The OP amplitude defines an intensity of training the accommodative system. Thus, if the HOPSA-lens is intended just to maintain the current accommodative ability (for example, for treating/preventing the Computer Visual Syndrome (CVS), or for presbyopia deferring), then the OP amplitude of 0.5 D may suffice, and the number of cycles can be increased.

If the aim is an increase of the accommodative amplitude (for example, for treating the accommodative dysfunction or insufficiency), then the OP amplitude can be chosen of 1.5 D, 2.0 D, and even more. At that, the maximum value of amplitude is limited mainly by the prescription (which, in its turn, is determined by the current value of accommodative amplitude and other parameters) and by the degree of visual deformations. The sample of HOPSA-lens having an OP amplitude of 1.0 D is shown in FIG. 8a.

The OP amplitude level, achievable by the state-of-the-art technologically, is more than 4.0 D, so this value is substantial only for the multi-cycles HOPSA-lenses. Values of 0.5÷3.0 D (including non-integer meanings) can preferably be used.

(C) An Optical Power Amplitude Regularity.

The OP amplitude value of multi-cycle HOPSA-lens can be constant or variable, as it is shown in FIG. 8g and FIG. 8f respectively. There are at least two considerable reasons for varying the OP amplitude.

First, it expands the variety of accommodative system training modes, providing a mild switching of accommodative strain/relaxation, along with multiplying the strain/relaxation cycles, while the lens' central zone (or adjacent zone) provides the full correction at a predetermined distance along the forward gaze direction.

Second, the OP amplitude decreasing along the principal meridian towards the lens periphery partially compensates the vertex distance changing (when the line of sight is diverged from the forward gaze direction) and the lens oblique aberrations.

(D) A Direction of Add Increase (a Positive and Negative Add).

The direction of OP changing can be positive, negative or mixed, depending on training goals. In FIG. 8a, the direction of changing the lens OP is exemplary shown positive. In this lens, OP increases from the basic OP value (at the left edge of the lens) to the maximum OP (at the lens' central zone) and decreasing back to the basic OP (at the right edge of the lens). This lens forces the patient to increase the accommodation on the left and right parts of text lines while reading with the stationary head, and allows for relaxing the accommodation on the central part of text lines. Herein, the full correction for reading distance is reached at the center of the lens.

Figure 8B:
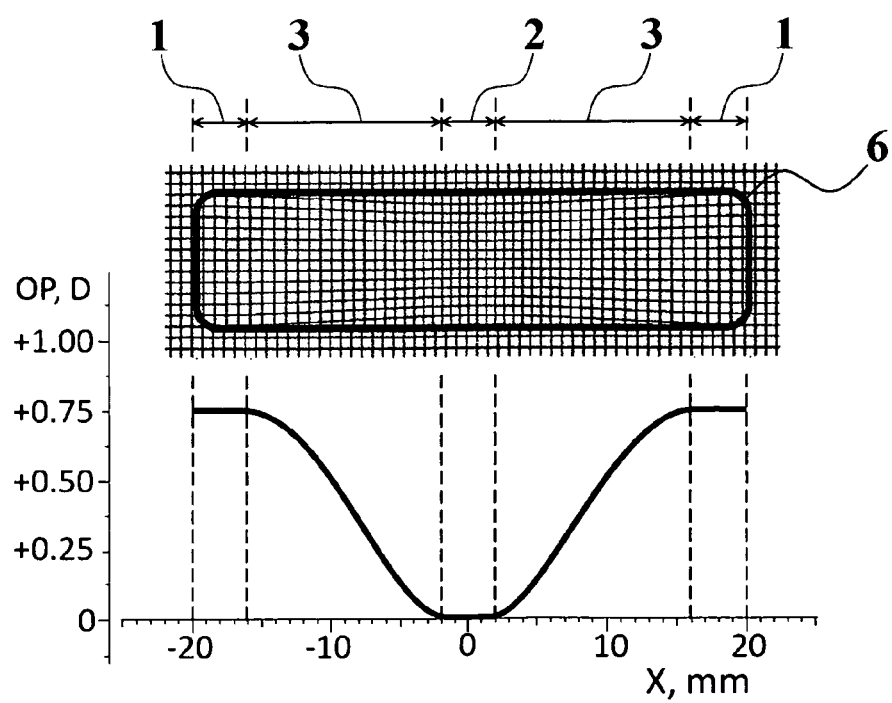

In FIG. 8b, the direction of OP changing of the HOPSA-lens 6 is exemplary shown negative, i.e. the central zone 2 of the lens is a far vision zone (an F-zone). This lens allows the patient to relax the accommodation on the left and right parts of text lines, and forces him to increase the accommodation at the central part of text lines. Herein, the full correction for reading distance is reached near the left and right edges of the lens. Areas 1 are the N-zones, areas 3 are progressive corridors.

Both the mono-cycle and the multi-cycle HOPSA-lenses may have mixed positive and negative OP changing directions. This lens design is mainly assigned for simultaneous training of patient's accommodative and dis-accommodative capabilities.

(E) A Difference Between the Left and Right Lenses.

The surfaces of HOPSA-lenses for binocular trainings can be identical or individual for each of the left and right eyes. If the HOPSA-lenses are assigned for the far vision training, the difference is negligible. However, for the near vision training (on the reading distance of 40 cm) this difference is considerable and important.

Fitting the left and right lenses with due account taken of the interpupillary distance correction for reading distance (i.e. where the space between the corresponding points of the left and right lenses is equal to the interpupillary distance for near vision) provides the identical refraction for both eyes in the forward gaze direction only. A gaze declining from the forward direction entails an inequality of refractive conditions for the left and right eyes. The difference mainly concerns the inequality of optical power and demanded convergence.

This difference may be used for training needs or can be eliminated using individually computed surfaces for the left and right HOPSA-lenses. The conventional technology of computation of the progressive lenses surfaces with "horizontal symmetry" is fully applicable.

The essence of the training process is the fact that the dynamic changing of the refractive conditions for the left and right eyes entails the vision system dynamic adaptation to these changes and the respective changes of accommodative and vergence strains.

An important requirement is that the patient's visual system should be able to maintain the binocular focusing and fusion, even if the periodical short-term full deployment of accommodative and fusional reserves is necessary.

The HOPSA-lens simulates the changing of distance from the eyes to the visual target, depending on the angle of the gaze with respect to the forward gaze direction. While gazing at the monitor through the real HOPSA-lenses, the patient perceives the monitor's surface slightly distorted.

Figure 9A:
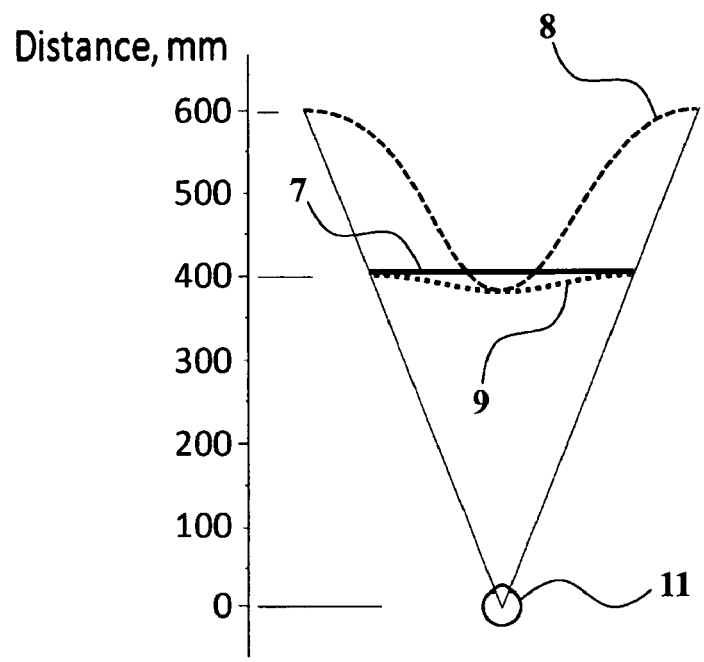
FIGS. 9a and 9b illustrate the visual distance changing simulation and visual target distortions for the HOPSA-lenses depicted on FIGS. 8a and 8b respectively.
Figure 9B:
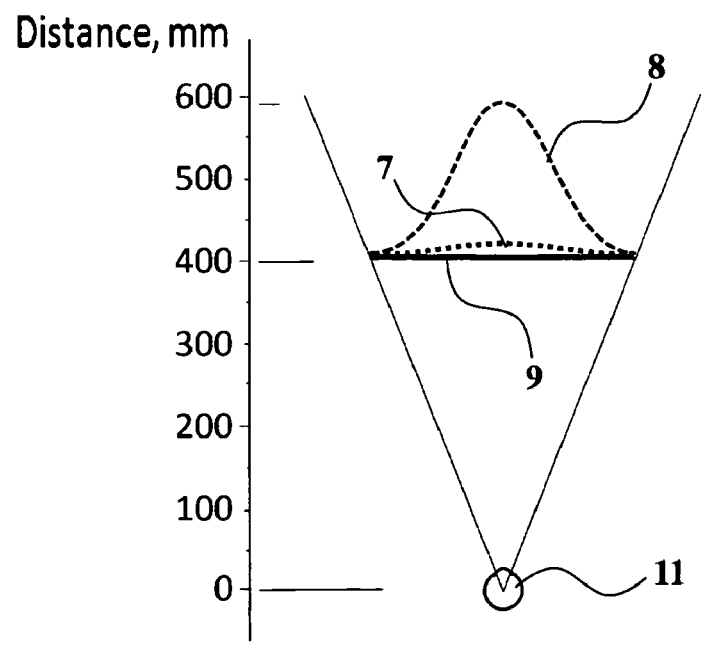

FIGS. 9a and 9b show how the visual perception of distance varies during the lateral shifting of fixation point.
Thus, the patient wearing HOPSA-lenses with a positive ADD, corresponding to FIG. 2a, perceives a flat monitor surface 7 as if it would be slightly convex, as shown in FIG. 9a. Herein, a generating line (generatrix) 8 indicates a curvature of the flat surface 7 perceived by the eye 11. The flat monitor looks as if it would be an old-style one with a convex screen. At that, the accommodative demands for the horizontally shifted points of monitor correspond to an imaginary surface of a generating line 9. FIG. 9b illustrates a distance simulating effect for the negative HOPSA-lenses of the same OP.

FIG. 9b illustrates a HOPSA-lens wherein the central zone of the lens is a far vision zone 2 (an F-zone) with the OP alternating distribution shown on FIG. 8b, whereas the side zones 1 are near vision zones (N-zones). Herein, a generating line (generatrix) 8 indicates a curvature of the flat surface 7 perceived by the eye 11. The accommodative demands for the horizontally shifted points of monitor correspond to an imaginary surface of a generating line 9.

Figure 10:
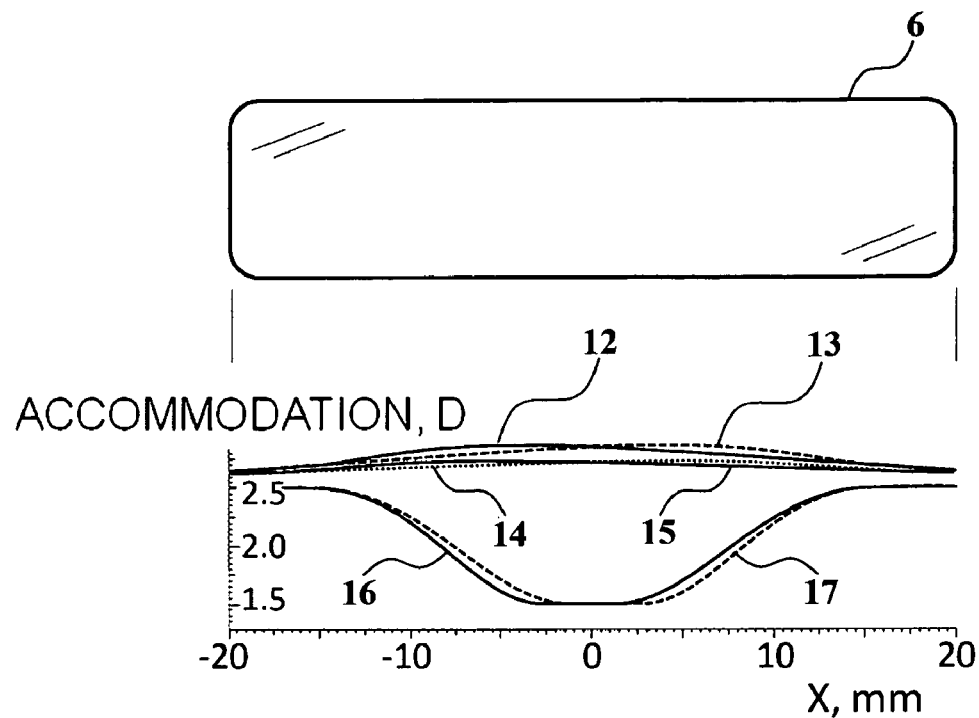
FIG. 10 illustrates the left and right eyes accommodative responses with and without HOPSA-lenses, binocularly, according to an embodiment of the present invention.

FIG. 10 illustrates the accommodative responses dynamics for both left and right eyes during a binocular visual examination of the monitor surface 7 corresponding to the scheme shown on FIG. 9a, with horizontal shifting of fixation point. Lines 15 and 14 represent the accommodative responses for the left and right unaided eyes respectively. Lines 12 and 13 represent the natural accommodative responses of the left and right eyes respectively, for the perceived curvature of the monitor surface with positive HOPSA-lenses 6 worn. Lines 16 and 17 represent the real accommodative responses to accommodative demands formed artificially with positive HOPSA-lenses.

Figure 11:
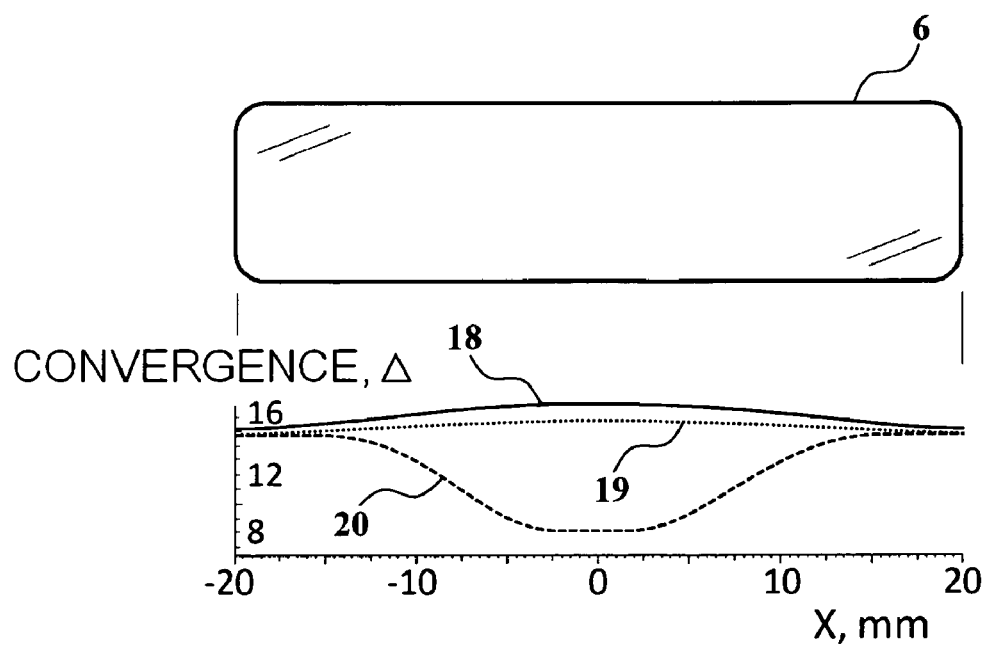
FIG. 11 shows the convergence dynamics with and without HOPSA-lenses depicted on FIG. 10.

FIG. 11 illustrates the corresponding dynamics for the convergence. Herein, a line 19 represents the convergence dynamic for unaided eyes. A line 18 is the natural convergence for the perceived curvature of the monitor surface with positive HOPSA-lenses 6 worn. A line 20 represents the real convergence dynamic formed artificially with HOPSA-lenses.

The dynamically and periodically changing of the difference between the accommodative convergence demand and the real fusional demand is the ground for convergence training.

The preliminary results of internal clinical trials (4 patients, 2.5÷4 months) suggest that intentionally uncompensated refractive differences for the left and right eyes using the identical HOPSA-lenses may become an effective special tool for visual system training.

Eliminating the refractive difference can be achieved using the free-form technology, or particularly using the state-of-the-art method of creating lens designs, in which horizontal symmetry and prism balance are maintained for the left and right eyes.

A sample of this technique is described by Furter (Carl Zeiss) in U.S. Pat. No. 4,606,622, Nov. 22, 1988. The left and right lenses surfaces being computed using this well-known method (or a similar one) may provide the congruence of optical power and/or the convergence invariability for each point of the principal meridian, with respect to the visual training distance.

Figure 12:
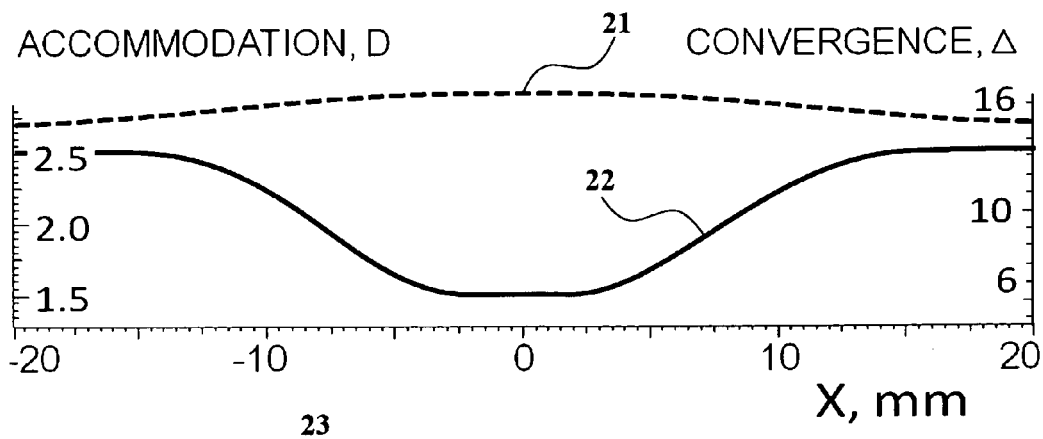

FIG. 12 illustrates the shifting of a fixation zone 23 during reading the text. Corresponding changes in convergence 21 and accommodative response 22 are the essence of accommodative and vergence systems training, along with the fusional ability improvement.

Therefore, a specific embodiment of the present invention can be represented by an apparatus for training a person's accommodative and vergence systems, wherein the training is provided for a person positioned at a predetermined distance from a visual target. The aforesaid apparatus comprises: —a retainer device suitable for wearing by the person in front of his/her eyes; —a left HOPSA-lens having a first surface; and—a right HOPSA-lens having a second surface; the left and right HOPSA-lenses are duly secured in the retainer device; wherein the first surface and the second surface are individually configured to essentially provide the congruence of optical power for each point of fixation during the training, or to essentially provide the convergence invariability for each point of fixation during the training.

(F) Optical Properties Splitting Between Lens Sides or Layers.

There are two main reasons for using more than one lens surface for realization of the HOPSA-lens optical properties: the lens' length along the principal meridian is not enough to fit the required number of cycles (that concerns the multi-cycle HOPSA-lens); the combining of the HOPSA-lens optical properties with the conventional basic refractive correction is applied (see items (J) and (K) below for detailed description of this issue).

The technologically achievable progression length of state-of-the-art short-corridor progressive lenses is less than 14 mm for ADD=3.0 D and less than 10 mm for ADD=1.0 D. The progressive zone of full OP changing cycle will occupy 28 mm (ADD=3.0 D) or 19 mm (ADD=1.0 D) along the principal horizontal meridian. Therefore, for mono-cycle HOPSA-lens of dimensions 40×10 mm, one full cycle can be fitted using only one lens surface for sure, even for maximum achievable ADD value. Up to 1.5 cycles can be fitted if ADD=3.0 D, and up to 2.0 cycles—if ADD=1.0 D—for multi-cycle HOPSA-lenses. Decreasing of multi-cycle HOPSA-lens amplitudes make it possible to fit up to 3 cycles. For example, 3 full cycles of amplitudes of 0.6 D; 1.0 D; 0.6 D can be fitted on the 38 mm of the principal meridian's length.

Using both lens surfaces (inner and outer) expands the possibilities for multi-cycle HOPSA-lenses manufacturing. For example, the central cycle can be formed on the inner lens surface, whereas two side cycles can be formed on the outer surface. The cycles formed on the inner and outer sides can partially overlap the adjacent ones. At that, the overlapping may provide a "soft" transition or a "hard" one. The "softness" of transitions is significant for ADD values of ≧1.0 D; for ADD values of <1.0 D, the cycles can overlap with the cycles adjacent thereto up to ⅓ of their width. This technique may be useful for producing multi-cycle HOPSA-lenses containing up to 5 cycles of OP changing. The multi-layer lens technology is applicable for producing multi-cycle lenses as well.

Thusly, in a specific embodiment, the HOPSA-lens lens may have a frontal side and a rear side, and one of the following may be provided: (A) only the frontal side is configured to provide the aforesaid alternating of optical power; (B) only the rear side is configured to provide the alternating of optical power; and (C) both the frontal side and the rear side are configured to provide the alternating of optical power.

In another specific embodiment, the HOPSA-lens may include a plurality of layers, and at least one layer of the plurality of layers is configured to provide the alternating of optical power.

(G) Standardized or Customized Prescription Method.

Any above-described HOPSA-lens design can be produced using free-form technology. It is suggested that a customized HOPSA-lens having individually computed surfaces should be ordered in advance. The order processing, lenses manufacturing, and logistics typically take a considerable time (up to three weeks and more) until the product will reach the customer. In order to bring the lenses closer to the end customer, it makes sense to use standardization of the basic optical power, the number of cycles, and the cycles' amplitudes (ADD).

HOPSA-lenses having the basic optical power stepped ±0.25 D; the ADD stepped 0.25 D, and the fixed number of cycles (0.5; 1; 1.5; 2; 3) would be suitable for most prescriptions. A predeterminedly limited stock of standardized lenses at the optician's office would in general allow a patient to get HOPSA-lenses immediately.

Retainer devices with HOPSA-lenses can be represented by:

(H) Spectacles.

The HOPSA-lenses can be installed into a conventional frame of any type, suitable for securing the lenses of vertical size of 10 mm. Rimless eyeglasses design is suitable as well. A conventional trial frame is also applicable (after some modification of trial lens holders).

The HOPSA-lens usually has a rectangular (or rectangular-like) shape with substantially parallel upper and lower edges. Boxing dimensions of a suitable frame are defined by the HOPSA-lenses dimensions, preferably: a vertical size of 10 mm, and a horizontal size of 40 mm (this dimensions can vary depending on certain HOPSA-lenses parameters).

As mentioned above, all HOPSA-lenses are symmetric with respect to the horizontal plane (vertical symmetry). The axis of vertical symmetry coincides with the lens' horizontal principal meridian.

Mono-cycle HOPSA-lenses, as well as multi-cycle HOPSA-lenses having an integer number of cycles, are simultaneously symmetric with respect to the vertical plane (horizontal symmetry).

Multi-cycle HOPSA-lenses having a non-integer number of cycles are symmetric with respect to the horizontal plane only, and asymmetric with respect to the vertical plane.

Due to the vertical symmetry, the HOPSA-lens has only one reference point located in the geometrical center of the lens, i.e. at the middle point of the horizontally oriented principal meridian. This point is considered as a HOPSA-lens optical center.

Herein, the term "optical center" is conditional: for horizontally symmetrical HOPSA-lenses (i.e. having a vertical symmetry axis, and also having a horizontal symmetry axis) it coincides with the real optical centre of the middle cycle; for horizontally asymmetrical HOPSA-lenses (having a horizontal symmetry axis only) the optical centre coincides with the middle point of progressive corridor, in which a magnitude of change of OP amplitude is substantially equal to 50% of the OP amplitude (e.g. if the amplitude is 1.0 D, then the change of amplitude will be 0.5 D).

The distance between the optical centers of HOPSA-lenses fitted into the frame should be equal to the interpupillary distance for a predetermined training distance to the target (near, far, or intermediate). At that, the distance between the fitted HOPSA-lens edges (left-to-left edges or right-to-right edges) is equal to the interpupillary distance as well.

For the customized HOPSA-lenses spectacles, the distance between optical centers is defined by prescription. For the standardized HOPSA-lenses spectacles (see the previous item (G) of this section), it is desirable the frame would provide the possibility of adjusting the interpupillary distance.

Figure 13:
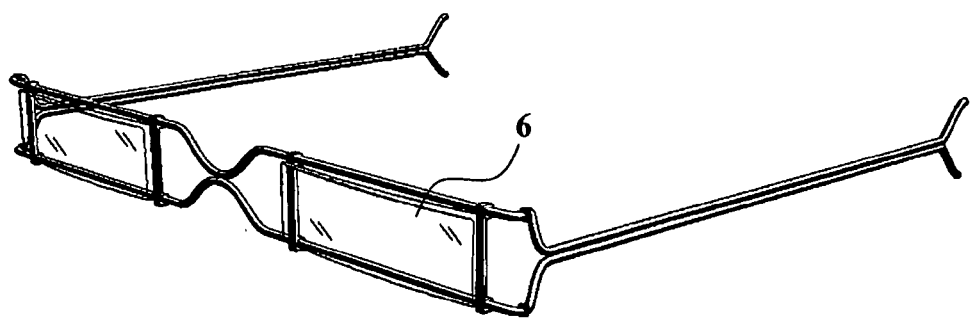
FIG. 13 is a sample of spectacles with HOPSA-lenses, according to an embodiment of the present invention.

An example of a simple frame with an adjustable interpupillary distance is shown in FIG. 13.

If the interpupillary distance (PD) is not adjustable, it is acceptable to fix the PD value to 58÷60 mm (for trainings at the near distance) or 62÷64 mm (for trainings at the far distance).

It is important, that if the horizontally asymmetrical HOPSA-lenses are supposed to be used in spectacles, the frame should have the full mirror symmetry (including nose-pads, sides and arms) with respect to the centered horizontal plane, to provide the possibility of upside-down spectacles wearing. Otherwise, the frame design should provide the possibility of easy lenses turning over.

A frame suitable for asymmetric HOPSA-lens spectacles is patented by Gao (U.S. Pat. No. 7,198,366, Apr. 3, 2007).

The pantoscopic tilt of HOPSA-lenses spectacles is generally 0÷5 degrees. The upside-down HOPSA-lenses spectacles have no pantoscopic tilt.

All other spectacles parameters (vertex distance, faceform etc.) are prescribed in accordance with the conventional practice of spectacles dispensing.

(I) An Add-On Clip for HOPSA-Lenses.

The HOPSA-lenses add-on clip (or "clip-on") is meant for using with the conventional spectacles, which provides the basic refractive correction (see item (K) of this section for details).

All design requirements and functional specifications for the HOPSA-lenses spectacles (described in the previous item (H) of this section) are applicable for the HOPSA-lenses clip-on.

Figure 14:
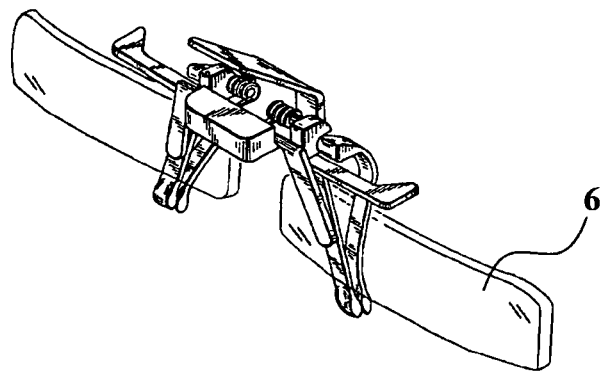
FIG. 14 is a sample of add-on clip with HOPSA-lenses, according to an embodiment of the present invention.

A suitable clip-on design for HOPSA-lenses is patented by Friedman (U.S. Pat. D350,359, Sep. 6, 1994). This clip-on is represented in FIG. 14.

Functional Combining of the basic refractive correction with the accommodative/vergence training.

All the above-discussed HOPSA-lens functionalities apply to emmetropic patients only.

For patients with the refractive errors (myopic, hyperopic, astigmatic etc.), two tasks are to be solved simultaneously: the basic refractive correction and training with HOPSA-lenses.

These tasks can be solved in two ways: —functional superposition of the basic correction and the training functions inside an integral lens (a 'built-in HOPSA-training function'); and—functional splitting of the basic correction and the training functions between the conventional lenses and HOPSA-lenses (a 'separated HOPSA-training function').

(J) Functional Superposition of Basic Correction and Training.

Figure 8C:
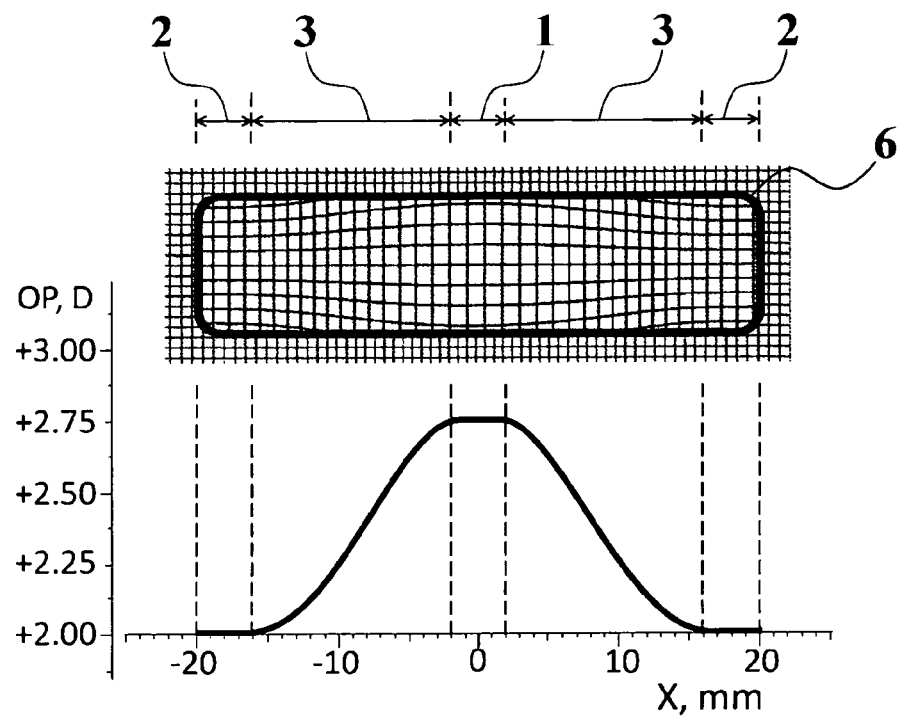
Figure 8D:
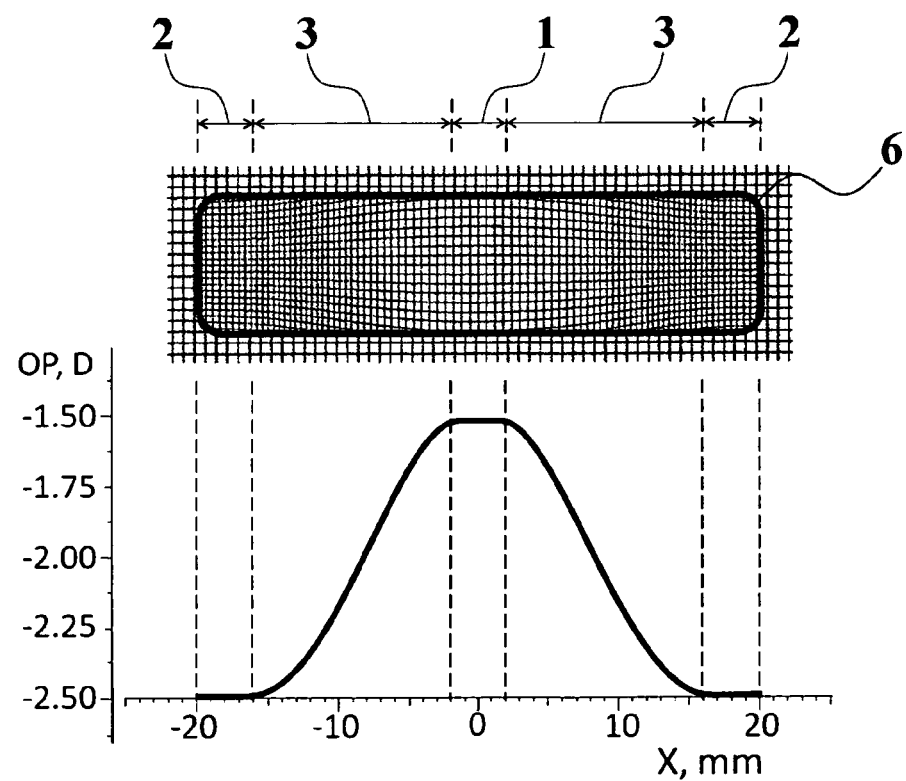
Figure 8E:
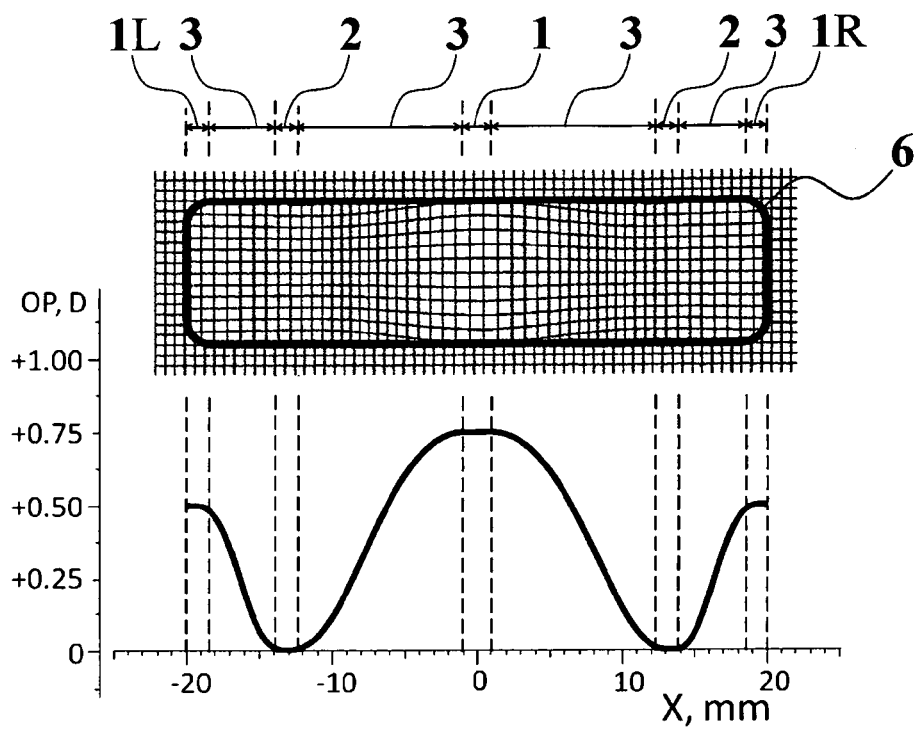
Figure 8F:
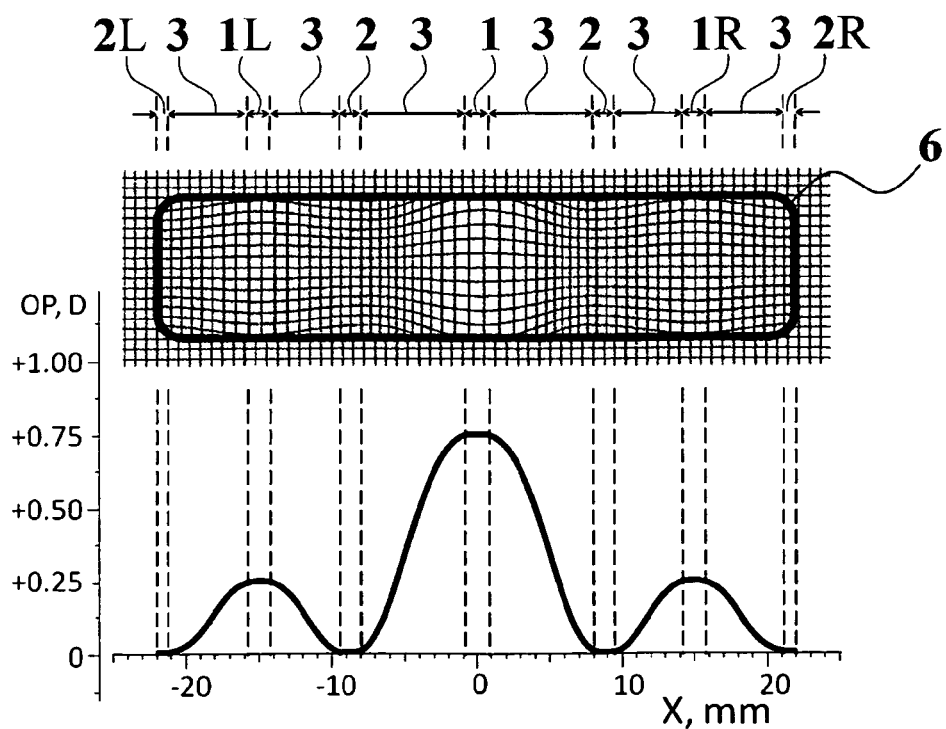
Figure 8G:
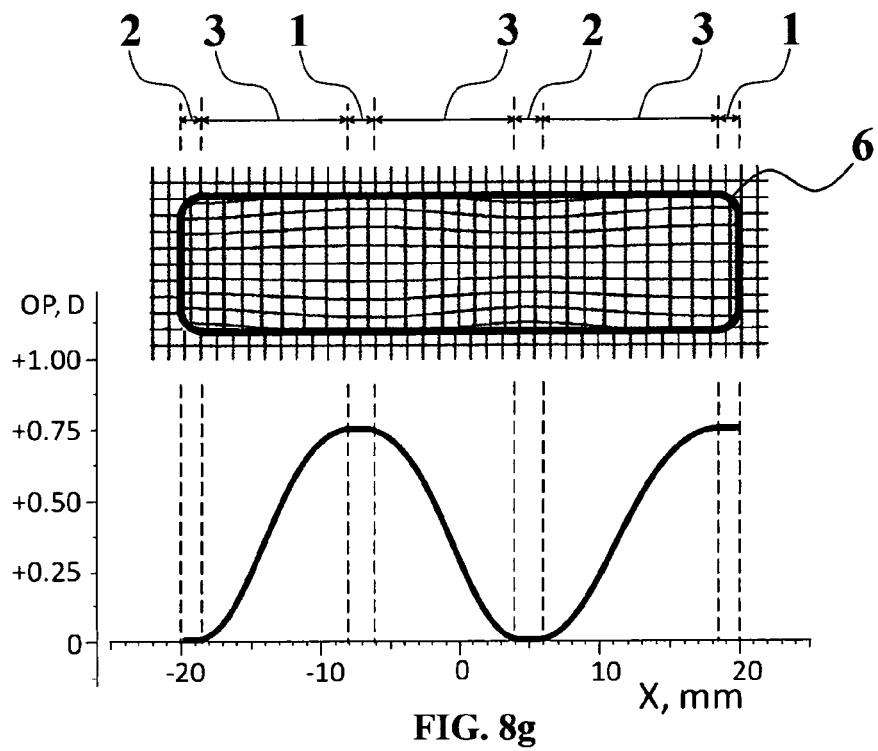
Figure 8H:
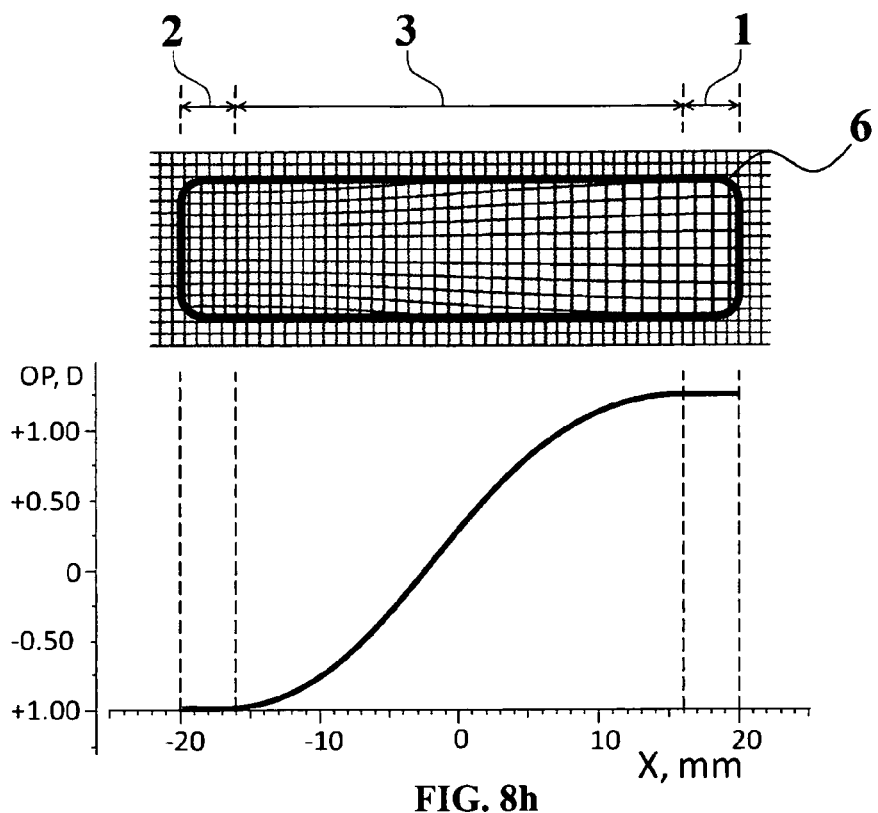

The functional superposition can be accomplished by computing of complex lens surfaces, which provides for both, the basic correction and the training functions. The computing method is fully similar to the state-of-the-art free-form technique. FIGS. 8c and 8d illustrate the mean power distribution in the HOPSA-lenses 6 assigned for hyperopic and myopic patients correspondingly. Area 1 is an N-zone, areas 2 are F-zones, areas 3 are progressive corridors. Free-form surfacing is capable of producing complex surface shapes, including aspheric, atoric, and progressive addition surfaces.

Astigmatism correction has only one limitation: astigmatic integral HOPSA-lenses cannot be used for wearing upside-down (i.e. the allowable number of HOPSA-lens cycles should be integer). The same limitation applies for anisometropia correction.

The integral HOPSA-lens optical properties can be placed on the front surface, back surface, or split between both. If the multi-layer technology is applied, all lens layers can be used for integral lens optics splitting.

For multi-cycle HOPSA-lens, the progressive optics itself can be split as well in order to shorten the progressive zone length.

Therefore, in specific embodiments of the present invention, the HOPSA-lens may have a surface configuration that provides integrating the aforesaid alternating of optical power with conventional refractive corrections of vision.

In more special embodiments of the present invention, the integral HOPSA-lens may have a frontal side and a rear side, and one of the following is provided: (A) only the frontal side is configured to provide the integrating; (B) only the rear side is configured to provide the integrating; and (C) both the frontal side and the rear side are configured to provide the integrating.

In other special embodiments of the present invention, the integral HOPSA-lens may have a plurality of layers, and at least one layer of the plurality of layers is configured to provide the integrating.

(K) Functional Splitting of Basic Correction and Training.

The functional splitting of basic correction and training is the realizing of these functions in separate devices. There are two ways for functional splitting implementation, depending on the method of basic refractive correction.

The first way is based on using contact lenses for full refractive errors correction. In this case, any of HOPSA-lenses spectacles are suitable for training function realizing. Moreover, using the toric contact lenses which make it possible to correct for both astigmatism and either myopia or hyperopia, eliminates the limitation of upside-down spectacles applying for the patients with astigmatism and/or anisometropia.

The second way is based on using the conventional eyeglasses for full refractive errors correction and the HOPSA-lenses add-on clip for training function implementation (or vice versa—HOPSA-lenses spectacles and add-on clip with conventional lenses for refractive errors correction). In these cases, the clip-on design should provide the minimal gap (distance) between the spectacles' and clip-on' lenses. The faceform of basic frame and clip-on should be similar.

Training Method Variations.

(L) Ways of Utilization of HOPSA-Lens Properties.

As discussed above, the training of the accommodative and vergence systems is based on dynamic changes of the accommodative strain and convergence demand, which dynamic changes occur due to shifting an intersection of the sight line with the lens' surface, wherein the shifting is directed along the lens' horizontal principal meridian that causes a respective alternating of optical power, which, in turn, initiates the dynamic changes in the mentioned systems. In general, this shifting can be carried out in two ways.

The first way is a shifting of the fixation point to the left or right, while the head is stationary. For example, reading the text lines with HOPSA-lenses worn, while the head is stationary, provides the needed dynamic changing of optical power. Playing the computer games, watching TV, etc. (i.e. almost any visual activity associated with visual fixation on a stationary flat target placed perpendicularly to the forward gaze direction) with HOPSA-lens worn is suitable for the intensive training of the accommodative and vergence systems.

The second way is a turning of the head to the left or right while holding the focus on a stationary fixation point. For example, trying to hold focus (and fusion, in the case of binocular training) on any fixed object or image with HOPSA-lenses worn, while the head is turning to the left or right, provides an effective accommodative and vergence systems training as well. As mentioned above, there is no need for changing the lens; the optical power changing is stepless; and standardized ophthalmological targets may be used.

It is possible to combine these two ways. For example, the mono-cycle HOPSA-lenses with the basic optical power of +1.0 D and ADD of 1.75 D may be used for hyperopic (+1.0 D) patient's training for both reading and for visual examination of distance targets.

(M) Target Types.

Types of the target may vary depending on the training assignment. The target types for 'training-while-reading' are considered below as representative examples.

A 'special' target is prepared for given training-while-reading conditions, wherein the following parameters are taken into account: a distance from the eyes to the target screen; a screen width; a font size; a text line length; etc.

A 'natural' target is any usual document (electronic or hard copy) without special requirements. Reading or processing of this document with suitable HOPSA-lenses worn provides the accommodative and vergence systems training of full-value.

The targets of 'mixed' types (i.e. combination of the aforesaid target types) may be used as well.

(N) Training Modes.

The training of the accommodative and vergence systems where the patient wears HOPSA-lenses may be: a 'purposeful training' mode (i.e. a single goal specified is the training process only); a 'background training' mode (e.g. the training process is combined with reading a book; or with document processing; or with playing a computer game; or with watching TV/video; etc.). A combination of the aforesaid two modes is applicable with a corresponding training assignment.

REFERENCES

1. William J. Benjamin 2006. Borish's Clinical refraction, second edition.
2. Ciuffreda K J Kruger P B. 1988. Dynamics of human voluntary accommodation. Am J Optom Physiol Opt 65:365-370.
3. Provine R R. Enoch 1M. 1975. On voluntary ocular accommodation. Perception & Psychophysics 17:209-212.
4. Ciuffreda K J, Hokoda S C, Hung G K, et al. 1984. Accommodative stimulus/response function in human amblyopia. Doc Ophthalmol 56:303-326.
5. Ciuffreda K J, Rumpf D. 1985. Contrast and accommodation in amblyopia. Vision Res 25:1445-1457.140 BENJAMIN Borishs Clinical Refraction 6. Ciuffreda K J, Hokoda S C. 1983. Spatial frequency dependence of accommodative responses in amblyopic eyes. Vision Res 23:1585-1594.
7. Marg E. 1951. An investigation of voluntary as distinguished from reflex accommodation. Am J Optom Arch Am Acad Optom 28:347-356.
8. Randle R I. 1970. Volitional control of visual accommodation. In Adaptation and Acclimatization in Aerospace Medicine (Proceedings No. 82), pp 20-1-20-11. France.
9. Randle R L Murphy M R. 1974. The dynamic response of visual accommodation over a seven-day period. Am J Optom Physiol Opt 51:530-544.
10. Levine S, Ciuffreda K J Selenow A, Flax N. 1985. Clinical assessment of accommodative facility in symptomatic and asymptomatic individuals. J Am Optom Assoc 56:286-290.
11. Liu J S, Lee M, lang L et al. 1979. Objective assessment of accommodation orthoptics: Dynamic insufficiency. Am J Optom Physiol Opt 56:285-294.
12. Griffin J R. 1976. Binocular Anomalies: Procedures for Vision Therapy. Chicago: Professional Press.
13. Gottlieb G L, Corcos O M, Iarie S, Agarwal Ge. 1988. Practice improves even the simplest movements. Exp Brain Res 73:436-440.
14. Mah M M, Pope R S, Wong I H. 1981. Testing of accommodative facility in elementary school-age children. 0.0. thesis, University of California, Berkeley, Calif.
15. Bobier W R, Sivak I G. 1983. Orthoptic treatment of subjects showing slow accommodative responses. Am ] Optom Physiol Opt 60:678-687.
16. Lovasik I V, Wiggins R. 1984. Cortical indices of impaired ocular accommodation and associated convergence mechanisms. Am J Optom Physiol Opt 61:150-159.
17. Cooper L Feldman L Selenow A, et al. 1987. Reduction of asthenopia after accommodative facility training. Am ] Optom Physiol Opt 64:430-436.
18. Hennessey D, Iosue R A, Rouse M W. 1984. Relation of symptoms to accommodative infacility of school-aged children. Am J Optom Physiol Opt 61:177-183.
19. Siderov L Di Guglielmo I. 1991. Binocular accommodative facility in prepresbyopic adults and its relation to symptoms. Optom Vis Sci 68:49-53.
20. Sterner B, Abrahamsson M, Sjostrom A. 1999. Accommodative facility training with a long term follow up in a sample of school aged children showing accommodative dysfunction. Doc Ophthalmol 99:93-101.
21. Wick B, Hall P. 1987. Relation among accommodative facility, lag, and amplitude in elementary school children. Am J Optom Physiol Opt 644:593-598.
22. Ciuffreda K J Levi D L, Selenow A. 1991. Amblyopia: Basic and Clinical Aspects. Boston: Butterworth/Heinemann.
23. Ciuffreda K J Hokoda S C, Hung G K et al. 1983. Static aspects of accommodation in human amblyopia. Am, Optom Physiol Opt 60:436-449.
24. Hokoda S C Ciuffreda K J: 1986. Different rates and amounts of vision function recovery during orthoptic therapy in an older strabismic amblyope. Ophthalmic Physiol Opt 6:213-220.
25. Selenow A. Ciuffreda K J. 1983. Vision function recovery during orthoptic therapy in an exotropic amblyope with high unilateral myopia. Am, Optom Physiol Opt 60:659-666.
26. Selenow A, Ciuffreda K J. 1986. Vision function recovery during orthoptic therapy in an adult strabismic amblyope, Am Optom Assoc 57:132-140.
27. Cooper L Pollak G L Ciuffreda K J et al. 2000. Accommodative and vergence findings in ocular myasthenia: A case analysis, Neuroophthalmol 20:5-11.
28. Ciuffreda K J Goldrich S G. 1983. Oculomotor biofeedback therapy. Int Rehab Med 5:111-117.
29. Bennett A. 1973 Variable and Progressive power lenses. Manufacturing Optics Int. March, 137-141.
30. Sheedy J E, Campbell C. 2005. Progressive powered lenses: the Minkwitz theorem, Optom Vis Sci. October; 82(10):916-22

We claim:

1. A multifocal ophthalmic lens, called a HOPSA-lens, for training a person's accommodative and vergence systems, said HOPSA-lens is duly secured in a retainer device suitable for wearing by the person subjected to said training being placed in front of his/her eyes; said HOPSA-lens has a variable optical power, a geometrical center, and a horizontal meridian extending through said geometrical center substantially horizontally in relation to said retainer device with a predetermined deviation; said HOPSA-lens is characterized with a plurality of vertical profiles perpendicular to said horizontal meridian; said HOPSA-lens comprises:

a predetermined number N of near vision zones, called N-zones, each said N-zone has a center located on the horizontal meridian and predetermined dimensions;

a predetermined number F of far vision zones, called F-zones, each said F-zone has a center located on the horizontal meridian and predetermined dimensions;

wherein each said F-zone being adjacent along said horizontal meridian to at least one said N-zone and vice-versa, thereby forming an N-F pair of zones; and a respective number of transitional corridors having predetermined dimensions, each said transitional corridor is disposed between the F and the N zones of each said N-F pair;

wherein said HOPSA-lens is characterized in that the optical power steplessly alternates substantially along said horizontal meridian only within said HOPSA-lens from any said N zone to the corresponding adjacent said F zone and vice-versa, while the optical power is invariable for each vertical profile from said plurality of vertical profiles.

2. The lens according to claim 1, wherein said number N and said number F are integer numbers, and the center of one said N-zone or the center of one said F-zone coincides with said geometrical center of the HOPSA-lens.

3. The lens according to claim 2, wherein:
either (A) said number N is equal to 1, and said number F is equal to 2, and the center of the N-zone coincides with said geometrical center of the HOPSA-lens;
or (B) said number N is equal to 2, and said number F is equal to 1, and the center of the F-zone coincides with said geometrical center of the HOPSA-lens.

4. The lens according to claim 1, wherein said number N is equal to 1, and said number F is equal to 1, thereby forming a half-cycle HOPSA-lens.

5. The lens according to claim 1, wherein said optical power alternates periodically or quasi-periodically.

6. The lens according to claim 1, wherein said deviation being within an angular range of ±5 degrees.

7. The lens according to claim 1, wherein said retainer device includes spectacles, or an add-on clip, or any combination thereof.

8. An apparatus for training a person's accommodative and vergence systems, said training is provided for a person positioned at a predetermined distance from a visual target; said apparatus comprising:

a retainer device suitable for wearing by the person in front of his/her eyes;
a left HOPSA-lens according to claim 1, said left HOPSA-lens has a first surface; and
a right HOPSA-lens according to claim 1, said right HOPSA-lens has a second surface;
said left and right HOPSA-lenses are duly secured in said retainer device; and
wherein the first surface and the second surface are individually configured to essentially provide a controllable varying of the optical power and prism balance along the horizontal meridian.

9. The lens according to claim 1, wherein said lens has a frontal side and a rear side, and one of the following is provided:
(A) only the frontal side is configured to provide said alternating of the optical power;
(B) only the rear side is configured to provide said alternating of the optical power; and
(C) both the frontal side and the rear side are configured to provide said alternating of the optical power.

10. The lens according to claim 1, wherein said lens includes a plurality of layers, and at least one layer of said plurality of layers is configured to provide said alternating of the optical power.

11. The lens according to claim 1, wherein said HOPSA-lens has a surface configuration that provides integrating said alternating of the optical power with conventional refractive corrections of vision.

12. The lens according to claim 11, wherein said HOPSA-lens has a frontal side and a rear side, and one of the following is provided:
(A) only the frontal side is configured to provide said integrating;
(B) only the rear side is configured to provide said integrating; and
(C) both the frontal side and the rear side are configured to provide said integrating.

13. The lens according to claim 11, wherein said HOPSA-lens includes a plurality of layers, and at least one layer of said plurality of layers is configured to provide said integrating.

14. An apparatus for training a person's accommodative and vergence systems combined with conventional vision correction, said apparatus comprising:
a retainer device suitable for wearing by the person in front of his/her eyes;
at least one HOPSA-lens according to claim 1, duly secured in said retainer device; and
at least one conventional correction lens worn by the person; said conventional correction lens provides the correction of basic refractive errors of the person.

15. The apparatus according to claim 14, wherein said at least one conventional correction lens is duly secured in said retainer device.

16. The apparatus according to claim 14, wherein said at least one conventional correction lens is either—at least one contact lens properly placed in front of at least one eye of the person, or—at least one conventional correction lens secured on a conventional frame placed behind said retainer device and in front of the eyes of said person.

17. A method for training a person's visual accommodative and vergence systems, said method comprising the steps of:
(1) providing at least one HOPSA-lens according to claim 1, said at least one HOPSA-lens is duly secured in a retainer device suitable for wearing by the person;
(2) setting up said retainer device with said at least one HOPSA-lens on the person's head in front of his/her eyes;
(3) carrying out said training in one of the following ways: either:
(3a)—setting the person's head in a stationary position; and
performing visual activity associated with lateral shifting the person's point of fixation on a visual target, while looking through said at least one HOPSA-lens; wherein said visual activity is selected from the group consisting essentially of: reading, document processing, watching video/TV, and playing computer games;
or:
(3b) setting any visual target in a stationary position; and turning of the head to the left or right while holding the person's fixation on the stationary visual target;
or
(3c) any combination of the steps (3a) and (3b).

18. The method according to claim 17, wherein said method is used for: human visual system therapy, eye diseases treatment/prevention, and ophthalmology researches.

19. The method according to claim 17, further comprising a set of preliminary steps preceding the step (1); said set of preliminary steps includes:
(a) a step for preliminary examination of the person's eyes;
(b) a step for setting forth objectives of the training;
(c) determining an acceptable level of the training intensity using data obtained from the steps (a) and (b);
(d) determining a configuration and dimensions of said at least one HOPSA-lens to be prescribed to the person, using data obtained from the steps (a), (b), and (c);
(e) a step for selecting said retainer device;
(f) a step for adjusting said retainer device;
(g) explanation of the training procedure to the person; and
(h) trial simulation of the real training process;
and said method further comprising a follow-up step conducted after the step (3); said follow-up step consists of periodic examinations of the person's visual systems.

20. The apparatus according to claim 8, wherein said controllable varying is so arranged that it essentially provides the congruence of optical power for each point of fixation during the training, and/or provides the convergence invariability for each point of fixation during the training.

* * * * *